United States Patent
Chun et al.

(10) Patent No.: US 10,687,037 B2
(45) Date of Patent: Jun. 16, 2020

(54) PHOTOGRAPHING APPARATUS AND CONTROL METHOD THEREOF

(71) Applicant: Samsung Electronics Co., Ltd., Gyeonggi-do (KR)

(72) Inventors: Hyung-Ju Chun, Gyeonggi-do (KR); Sung-Oh Kim, Gyeonggi-do (KR); Hyun-Hee Park, Seoul (KR); Yong-Man Lee, Gyeonggi-do (KR); Jae-Moon Kim, Gyeonggi-do (KR); Seul-Ki Jang, Gyeonggi-do (KR); Jong-Bum Choi, Yongin-si (KR); Jung-Jun Lee, Seoul (KR); Sung-Jun Lim, Incheon (KR); Kwang-Tai Kim, Suwon-si (KR); Soo-Hyung Kim, Gyeonggi-do (KR); Dong-Hyun Yeom, Gyeonggi-do (KR); Ki-Huk Lee, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 0 days.

(21) Appl. No.: 16/092,801

(22) PCT Filed: Apr. 11, 2017

(86) PCT No.: PCT/KR2017/003933
§ 371 (c)(1),
(2) Date: Oct. 11, 2018

(87) PCT Pub. No.: WO2017/179902
PCT Pub. Date: Oct. 19, 2017

(65) Prior Publication Data
US 2019/0158795 A1 May 23, 2019

(30) Foreign Application Priority Data
Apr. 11, 2016 (KR) .................. 10-2016-0044421

(51) Int. Cl.
*H04N 9/093* (2006.01)
*H04N 5/232* (2006.01)
(Continued)

(52) U.S. Cl.
CPC .............. *H04N 9/73* (2013.01); *H04N 5/225* (2013.01); *H04N 5/232* (2013.01);
(Continued)

(58) Field of Classification Search
CPC ...... H04N 5/2351; H04N 5/232; H04N 5/225; H04N 9/73; H04N 9/093; H04N 9/64
See application file for complete search history.

(56) References Cited

U.S. PATENT DOCUMENTS 7,561,621 B2 * 7/2009 Itoh ..................... H04N 5/145
375/240.16
8,115,825 B2    2/2012 Culbert et al.
(Continued)

FOREIGN PATENT DOCUMENTS

JP       2010-4533 A       1/2010
KR  10-2011-0074556 A      6/2011
(Continued)

OTHER PUBLICATIONS

European Search Report dated Feb. 18, 2019.

*Primary Examiner* — Lin Ye
*Assistant Examiner* — John H Morehead, III
(74) *Attorney, Agent, or Firm* — Cha & Reiter, LLC.

(57) ABSTRACT

A photographing apparatus is disclosed. A photographing apparatus according to one embodiment comprises: a first image sensor; a second image sensor; and at least one processor functionally coupled to the first image sensor and the second image sensor, wherein the at least one processor may be configured to: obtain, by using the first image sensor, a first image which includes a first pixel, a second pixel
(Continued)

adjacent to the first pixel, and a third pixel adjacent to the second pixel in an area other than the area in which the second pixel and the first pixel are adjacent; obtain, by using the second image sensor, a second image which includes a fourth pixel associated with the first pixel on the basis of the position thereof, and a fifth pixel adjacent to the fourth pixel and associated with the second pixel on the basis of the position thereof; determine whether a difference in luminance between the first pixel and the second pixel falls within a designated range; and, when the difference in the luminance between the first pixel and the second pixel falls within the designated range, generate color information corresponding to at least one of the first pixel and the second pixel at least on the basis of the color information of the fourth pixel and the color information of the fifth pixel.

11 Claims, 15 Drawing Sheets

(51) Int. Cl.
  *H04N 9/73* (2006.01)
  *H04N 9/64* (2006.01)
  *H04N 5/225* (2006.01)
  *H04N 5/235* (2006.01)

(52) U.S. Cl.
  CPC ........... *H04N 5/2351* (2013.01); *H04N 9/093* (2013.01); *H04N 9/64* (2013.01)

(56) References Cited

U.S. PATENT DOCUMENTS

| | | | |
|---|---|---|---|
| 8,681,250 | B2 | 3/2014 | Culbert et al. |
| 9,225,889 | B1* | 12/2015 | Korkin ................. H04N 5/2258 |
| 2009/0207272 | A1 | 8/2009 | Culbert et al. |
| 2009/0285476 | A1* | 11/2009 | Choe ..................... H04N 9/045 |
| | | | 382/162 |
| 2009/0316172 | A1 | 12/2009 | Tanimoto |
| 2010/0073499 | A1 | 3/2010 | Gere |
| 2011/0267483 | A1* | 11/2011 | Kanamori ................. G06T 1/00 |
| | | | 348/220.1 |
| 2013/0038698 | A1* | 2/2013 | Yoshida ............... G06K 9/6203 |
| | | | 348/47 |
| 2013/0229544 | A1* | 9/2013 | Bando .................... H04N 9/093 |
| | | | 348/222.1 |
| 2014/0009469 | A1 | 1/2014 | Shin et al. |
| 2016/0080626 | A1* | 3/2016 | Kovtun ................ H04N 5/2355 |
| | | | 348/218.1 |

FOREIGN PATENT DOCUMENTS

| | | |
|---|---|---|
| KR | 10-2013-0032782 A | 4/2013 |
| KR | 10-2014-0007511 A | 1/2014 |
| KR | 10-2016-0031819 A | 3/2016 |
| WO | 98/15126 A1 | 4/1998 |

* cited by examiner

PHOTOGRAPHING APPARATUS AND CONTROL METHOD THEREOF

CROSS-REFERENCE TO RELATED APPLICATION(S)

This application is a National Phase Entry of PCT International Application No. PCT/KR2017/003933, which was filed on Apr. 11, 2017 and claims priority under 35 U.S.C. § 119 of Korean Patent Application No. 10-2016-0044421, filed on Apr. 11, 2016, in the Korean Intellectual Property Office the disclosure of which is incorporated herein by reference in its entirety.

TECHNICAL FIELD

The present disclosure relates to a photographing apparatus and a method for controlling the same, and more particularly, to a method for generating an output image by using a monochrome image and a color image.

BACKGROUND ART

Recently, technologies have emerged that allow users to photograph objects by using camera modules included in smart phones.

In particular, the user may photograph a desired object by using the camera module and check an image including the photographed object through a color screen.

With such an image obtaining technology using the camera module, the user may store an image of the object in the smart phone and continue to see the stored image.

DETAILED DESCRIPTION OF THE INVENTION

Technical Problem

As described above, when the user uses the camera module included in the conventional smart phone, on an outer side of a lens of the camera module, a color filter array (CFA) is needed, which degrades, in practice, the performance of the camera module (e.g., degrades a display quality in the low illumination, or the like), and moreover, a processor in the smart phone has to deduce a partial region of a pixel region of a captured image from a low-resolution pixel region to generate some pixels.

As a result, the user inevitably sees a low-quality color image.

The present disclosure is made to solve the foregoing or other problems, and provides a photographing apparatus capable of a high-resolution color image.

Technical Solution

According to various embodiments of the present disclosure, a photographing apparatus includes a first image sensor, a second image sensor, and at least one processor functionally connected with the first image sensor and the second image sensor, in which the at least one processor is further configured to obtain a first image including a first pixel, a second pixel adjacent to the first pixel, and a third pixel adjacent to the second pixel in an area other than an area where the second pixel is adjacent to the first pixel, by using the first image sensor, to obtain a second image including a fourth pixel associated based on a position of the first pixel and a fifth pixel that is adjacent to the fourth pixel and associated based on a position of the second pixel, by using the second image sensor, to determine whether a luminance difference between the first pixel and the second pixel falls within a designated range, and to generate color information corresponding to at least one of the first pixel and the second pixel, at least based on color information of the fourth pixel and color information of the fifth pixel, when the luminance difference between the first pixel and the second pixel falls within the designated range.

According to various embodiments of the present disclosure, a method for controlling a photographing apparatus includes obtaining a first image including a first pixel, a second pixel adjacent to the first pixel, and a third pixel adjacent to the second pixel in an area other than an area where the second pixel is adjacent to the first pixel, obtaining a second image including a fourth pixel associated based on a position of the first pixel and a fifth pixel that is adjacent to the fourth pixel and associated based on a position of the second pixel, determining whether a luminance difference between the first pixel and the second pixel falls within a designated range, and generating color information corresponding to at least one of the first pixel and the second pixel, at least based on color information of the fourth pixel and color information of the fifth pixel, when the luminance difference between the first pixel and the second pixel falls within the designated range.

According to various embodiments of the present disclosure, a photographing apparatus includes a first camera module configured to obtain a monochrome image of a first resolution, including an object, a second camera module configured to obtain a color image of a second resolution lower than the first resolution, which includes the object, and a processor configured to obtain a color image of the first resolution by using contour information of the object obtained from the monochrome image of the first resolution and the color image of the second resolution.

According to various embodiments of the present disclosure, a method for controlling a photographing apparatus includes obtaining a monochrome image of a first resolution, including an object, obtaining a color image of a second resolution lower than the first resolution, which includes the object, and obtaining a color image of the first resolution by using contour information of the object obtained from the monochrome image of the first resolution and the color image of the second resolution.

Advantageous Effects

According to various embodiments of the present disclosure, the user is capable of obtaining a high-quality color image.

Moreover, according to various embodiments of the present disclosure, the user is capable of accurately and quickly obtaining a high-quality color image.

Furthermore, according to various embodiments of the present disclosure, the user is capable of obtaining a high-quality color image that is brighter and clearer than that obtained using a conventional technique.

MODE FOR CARRYING OUT THE INVENTION

Figure 1:
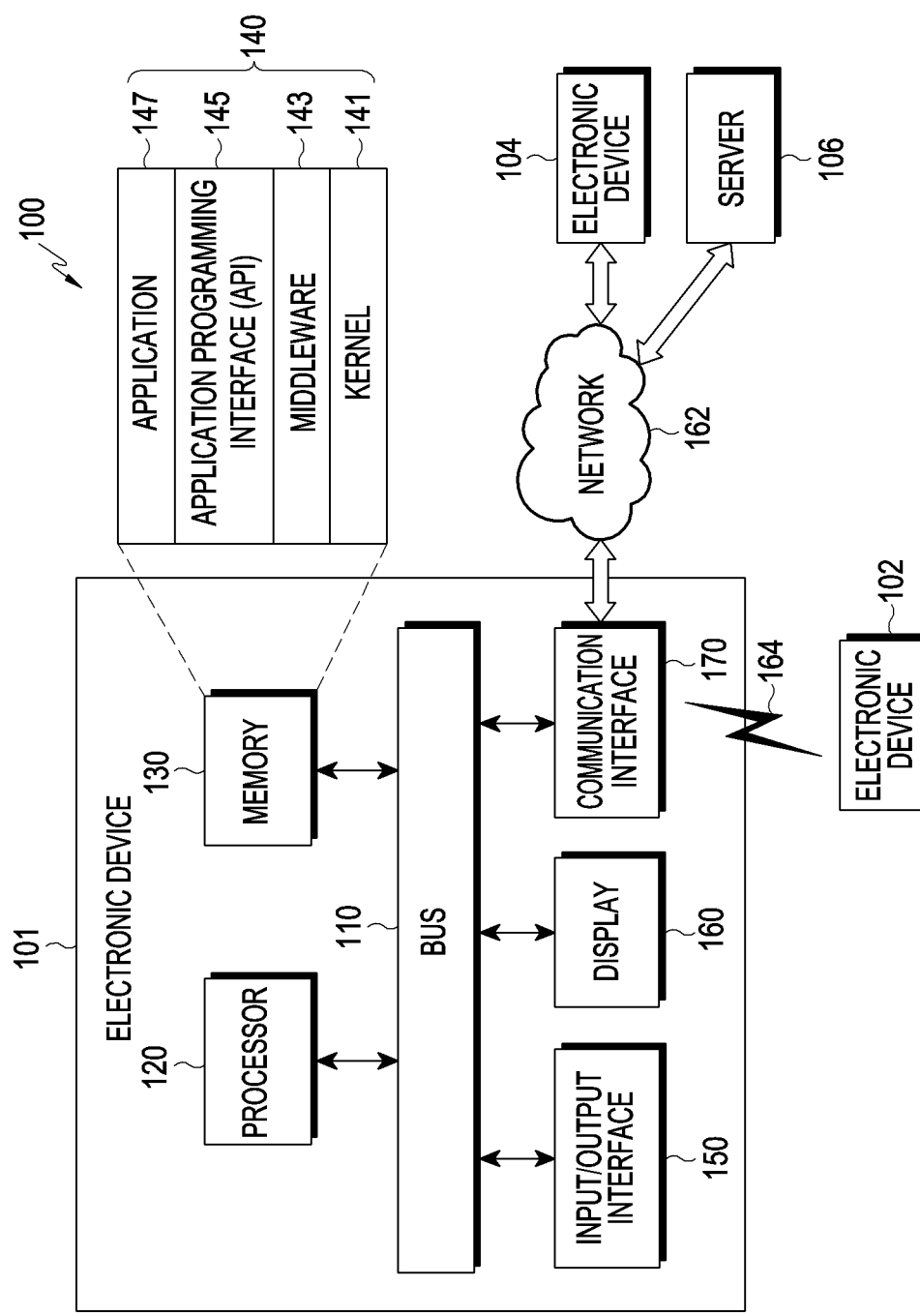
FIG. 1 is a block diagram of an electronic device and a network according to various embodiments of the present disclosure.

Hereinafter, various embodiments of the present disclosure will be disclosed with reference to the accompanying drawings. However, embodiments and terms used therein are not intended to limit the present disclosure to particular embodiments, and it should be construed as including various modifications, equivalents, and/or alternatives according to the embodiments of the present disclosure. With regard to the description of the drawings, similar reference numerals may be used to refer to similar or related elements. The singular forms are intended to include the plural forms as well, unless the context clearly indicates otherwise. In the present disclosure, an expression such as "A or B," "at least one of A or/and B," or "one or more of A or/and B" may include all possible combinations of together listed items. Expressions such as "first," "second," "primarily," or "secondary," used herein may represent various elements regardless of order and/or importance and do not limit corresponding elements. When it is described that an element (such as a first element) is "operatively or communicatively coupled with/to" or "connected" to another element (such as a second element), the element can be directly connected to the other element or can be connected to the other element through another element (e.g., a third element).

An expression "configured to (or set)" used in the present disclosure may be replaced with, for example, "suitable for," "having the capacity to," "adapted to," "made to," "capable of," or "designed to" according to a situation. Alternatively, in some situation, an expression "apparatus configured to" may mean that the apparatus "can" operate together with another apparatus or component. For example, a phrase "a processor configured (or set) to perform A, B, and C" may be a dedicated processor (e.g., an embedded processor) for performing a corresponding operation or a generic-purpose processor (such as a central processing unit (CPU) or an application processor) that can perform a corresponding operation by executing at least one software program stored at a memory device.

An electronic device according to various embodiments of the present disclosure may include at least one of, for example, a smartphone, a tablet personal computer (PC), a mobile phone, a video phone, an electronic-book (e-book) reader, a desktop PC, a laptop PC, a netbook computer, a workstation, a server, a personal digital assistant (PDA), a portable multimedia player (PMP), an MP3 player, a mobile medical equipment, a camera, and a wearable device. Examples of the wearable device may include at least one of an accessory type (e.g., a watch, a ring, a bracelet, an anklet, a necklace, glasses, contact lenses, head-mounted device (HMD), etc.), a fabric or cloth-integrated type (e.g., electronic clothing, etc.), a body-attached type (e.g., a skin pad, a tattoo, etc.), a body implanted type (e.g., an implantable circuit, etc.), and so forth. In some embodiments, the electronic device may include, for example, a television (TV), a Digital Video Disk (DVD) player, audio equipment, a refrigerator, an air conditioner, a vacuum cleaner, an oven, a microwave oven, a laundry machine, an air cleaner, a set-top box, a home automation control panel, a security control panel, a TV box (e.g., HomeSync™ of Samsung, TV™ of Apple, or TV™ of Google), a game console, an electronic dictionary, an electronic key, a camcorder, and an electronic frame.

In other embodiments, the electronic device may include at least one of various medical equipment (for example, magnetic resonance angiography (MRA), magnetic resonance imaging (MRI), computed tomography (CT), an imaging device, or an ultrasonic device), a navigation system, a global positioning system (GPS) receiver, an event data recorder (EDR), a flight data recorder (FDR), a vehicle infotainment device, electronic equipment for ships (e.g., a navigation system and gyro compass for ships), avionics, a security device, a vehicle head unit, an industrial or home robot, an automatic teller's machine (ATM), a point of sales (POS), Internet of things (e.g., electric bulbs, various sensors, electricity or gas meters, sprinkler devices, fire alarm devices, thermostats, streetlights, toasters, exercise machines, hot-water tanks, heaters, boilers, and so forth). According to some embodiments, the electronic device may include a part of a furniture, building/structure or a part of a vehicle, an electronic board, an electronic signature receiving device, a projector, and various measuring instruments (e.g., a water, electricity, gas, electric wave measuring device, etc.). According to various embodiments, the electronic device may be flexible or may be a combination of two or more of the above-described various devices. According to an embodiment of the disclosure, the electronic devices are not limited to those described above. Herein, the term "user" used in various embodiments of the present disclosure may refer to a person who uses the electronic device or a device using the electronic device.

Referring to FIG. 1, an electronic device 101 in a network environment 100 according to various embodiments of the present disclosure is disclosed. The electronic device 101 may include a bus 110, a processor 120, a memory 130, an input/output (I/O) interface 150, a display 160, and a communication interface 170. According to some embodiments, the electronic device 101 may omit at least one of the foregoing elements or may further include other elements. The bus 110 may include a circuit for connecting, e.g., the elements 110 to 170 and delivering communication (e.g., a control message or data) between the elements 110 to 170. The processor 120 may include one or more of a central processing unit (CPU), an application processor (AP), and a communication processor (CP). The processor 120 performs operations or data processing for control and/or communication of, for example, at least one other elements of the electronic device 101.

The memory 130 may include a volatile and/or nonvolatile memory. The memory 130 may store, for example, instructions or data associated with at least one other elements of the electronic device 101. According to an embodiment of the present disclosure, the memory 130 may store software and/or a program 140. The program 140 may include at least one of, for example, a kernel 141, middleware 143, an application programming interface (API) 145, and/or an application program (or "application") 147, and the like. At least some of the kernel 141, the middleware 143, and the API 145 may be referred to as an operating system (OS). The kernel 141 may control or manage, for example, system resources (e.g., the bus 110, the processor 120, the memory 130, etc.) used to execute operations or functions implemented in other programs (e.g., the middleware 143, the API 145, or the application program 147). The kernel 141 provides an interface through which the middleware 143, the API 145, or the application program 147 accesses separate components of the electronic device 101 to control or manage the system resources.

The middleware 143 may work as an intermediary for allowing, for example, the API 145 or the application program 147 to exchange data in communication with the kernel 141. In addition, the middleware 143 may process one or more task requests received from the application program 147 based on priorities. For example, the middleware 143 may give a priority for using a system resource (e.g., the bus 110, the processor 120, the memory 130, etc.) of the electronic device 101 to at least one of the application programs 147, and may process the one or more task requests. The API 145 is an interface used for the application 147 to control a function provided by the kernel 141 or the middleware 143, and may include, for example, at least one interface or function (e.g., an instruction) for file control, window control, image processing or character control. The I/O interface 150 may deliver, for example, an instruction or data input from a user or another external device to other component(s) of the electronic device 101, or output an instruction or data received from other component(s) of the electronic device 101 to a user or another external device.

The display 160 may include, for example, a liquid crystal display (LCD), a light emitting diode (LED) display, an organic light emitting diode (OLED) display, a microelectromechanical system (MEMS) display, or an electronic paper display. The display 160 may, for example, display various contents (e.g., a text, an image, video, an icon, and/or a symbol, etc.) to users. The display 160 may include a touch screen, and receives a touch, a gesture, proximity, or a hovering input, for example, by using an electronic pen or a part of a body of a user. The communication interface 170 establishes communication between the electronic device 101 and an external device (e.g., a first external electronic device 102, a second external electronic device 104, or a server 106). For example, the communication interface 170 may be connected to a network 162 through wireless communication 164 or wired communication to communicate with an external device (e.g., the second external electronic device 104 or the server 106).

The wireless communication may include cellular communication using at least one of Long Term Evolution (LTE), LTE-Advanced (LTE-A), Code Division Multiple Access (CDMA), Wideband CDMA (WCDMA), a Universal Mobile Telecommunication System (UMTS), Wireless Broadband (WiBro), or Global System for Mobile Communications (GSM)). According to an embodiment, the wireless communication may include at least one of Wireless Fidelity (WiFi), Bluetooth, Bluetooth Low Energy (BLE), Zigbee, near field communication (NFC), magnetic secure transmission (MST), radio frequency (RF), and a body area network (BAN). According to an embodiment, the wireless communication may include GNSS. The GNSS may include, for example, at least one of a global positioning system (GPS), a global navigation satellite system (Glonass), a Beidou navigation satellite system ("Beidou"), and Galileo, the European global satellite-based navigation system. Hereinbelow, "GPS" may be used interchangeably with "GNSS". The wired communication may include, for example, at least one of USB, HDMI, RS-232, power line communication, and POTS. The network 162 may include a telecommunications network, for example, at least one of a computer network (e.g., a local area network (LAN) or a wide area network (WAN)), Internet, and a telephone network.

Each of the first external electronic device 102 and the second external electronic device 104 may be a device of the same type as or a different type than the electronic device 101. According to various embodiments of the present disclosure, some or all of operations performed by the electronic device 101 may be performed in another electronic device or a plurality of electronic devices (e.g., the electronic device 102 or 104, or the server 106). According to an embodiment of the present disclosure, when the electronic device 101 has to perform a function or a service automatically or at a request, the electronic device 101 may request another device (e.g., the electronic devices 102 or 104 or the server 106) to perform at least some functions associated with the function or the service instead of or in addition to executing the function or the service. The another electronic device (e.g., the electronic device 102 or 104 or the server 106) may execute the requested function or additional function and deliver the execution result to the electronic device 101. The electronic device 101 may then process or further process the received result to provide the requested function or service. To that end, a cloud computing, distributed computing, or client-server computing technology may be used, for example.

Figure 2:
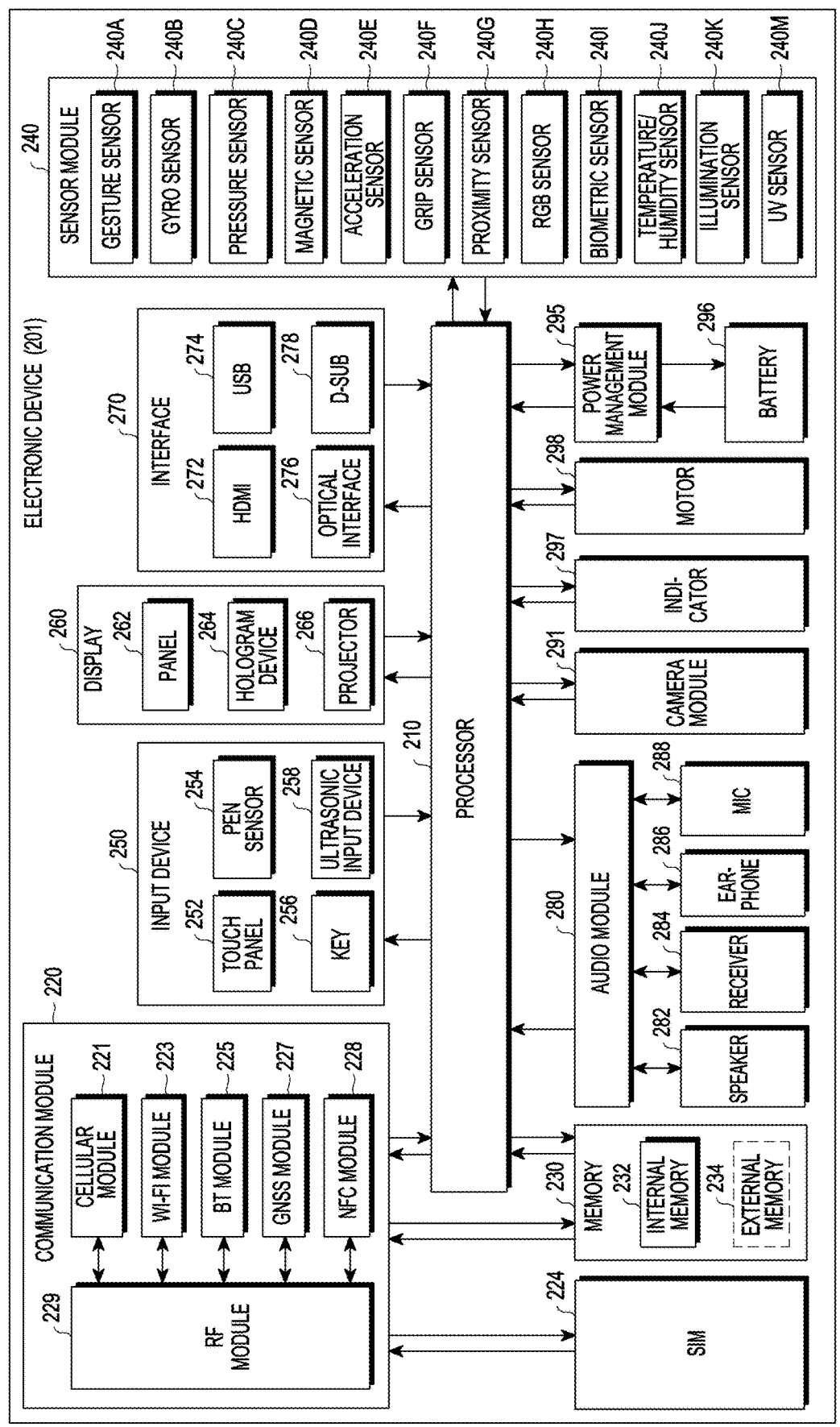
FIG. 2 is a block diagram of an electronic device according to various embodiments.

FIG. 2 is a block diagram of an electronic device 201 according to various embodiments of the present disclosure. The electronic device 201 may form the entire electronic device 101 illustrated in FIG. 1 or a part of the electronic device 101 illustrated in FIG. 1. The electronic device 201 may include one or more processors (e.g., application processors (APs)) 210, a communication module 220, a subscriber identification module (SIM) 224, a memory 230, a sensor module 240, an input device 250, a display 260, an interface 270, an audio module 280, a camera module 291, a power management module 295, a battery 296, an indicator 297, and a motor 298. The processor 210 controls multiple hardware or software components connected to the processor 210 by driving an Operating System (OS) or an application program, and performs processing and operations with respect to various data. The processor 210 may be implemented with, for example, a system on chip (SoC). According to an embodiment of the present disclosure, the server 210 may include a GPU and/or an image signal processor. The processor 210 may include at least some of the elements illustrated in FIG. 2 (e.g., the cellular module 221). The processor 210 loads an instruction or data received from at least one of other elements (e.g., a non-volatile memory) into a volatile memory to process the instruction or data, and stores result data in the non-volatile memory.

The communication module 220 may have a configuration that is the same as or similar to the communication interface (e.g., the communication interface 170) illustrated in FIG. 1. The communication module 220 may include, for example, the cellular module 221, a WiFi module 223, a Bluetooth (BT) module 225, a GNSS module 227, a near field communication (NFC) module 228, and a radio frequency (RF) module 229. The cellular module 221 may provide, for example, a voice call, a video call, a text service, or an Internet service over a communication network. According to an embodiment, the cellular module 221 identifies and authenticates the electronic device 201 in a communication network by using the SIM 224 (e.g., a SIM card). According to an embodiment, the cellular module 221 performs at least one of functions that may be provided by the processor 210. According to an embodiment, the cellular module 221 may include a communication processor (CP). According to some embodiment, at least some (e.g., two or more) of the cellular module 221, the WiFi module 223, the BT module 225, the GNSS module 227, and the NFC module 228 may be included in one integrated chip (IC) or IC package. The RF module 229 may, for example, transmit and receive a communication signal (e.g., an RF signal). The RF module 229 may include a transceiver, a power amp module (PAM), a frequency filter, a low noise amplifier (LNA), or an antenna. According to another embodiment, at least one of the cellular module 221, the WiFi module 223, the BT module 225, the GNSS module 227, and the NFC module 228 may transmit and receive an RF signal through the separate RF module. The SIM 224 may, for example, include a card including a SIM or an embedded SIM, and may include unique identification information (e.g., an integrated circuit card identifier (ICCID) or subscriber information (e.g., an international mobile subscriber identity (IMSI)).

The memory 230 (e.g., the memory 130) may, for example, include an internal memory 232 and/or an external memory 234. The internal memory 232 may, for example, include at least one of a volatile memory (e.g., dynamic random-access memory (DRAM), static RAM (SRAM), synchronous dynamic RAM (SDRAM), etc.), and a non-volatile memory (e.g., one time programmable read only memory (OTPROM), programmable ROM (PROM), erasable and programmable ROM (EPROM), electrically erasable and programmable ROM (EEPROM), etc.), mask ROM, flash ROM, a flash memory, and a solid-state drive (SSD). The external memory 234 may further include flash drive, for example, compact flash (CF), secure digital (SD), micro-SD, mini-SD, extreme Digital (xD), a multi-media card (MMC), or a memory stick. The external memory 234 may be functionally or physically connected with the electronic device 201 through various interfaces.

The sensor module 240 measures physical quantity or senses an operation state of the electronic device 201 to convert the measured or sensed information into an electric signal. The sensor module 240 may, for example, include at least one of a gesture sensor 240A, a gyro sensor 240B, a pressure sensor 240C, a magnetic sensor 240D, an acceleration sensor 240E, a grip sensor 240F, a proximity sensor 240G, a color sensor 240H (e.g., RGB sensor), a biometric sensor 240I, a temperature/humidity sensor 240J, an illumination sensor 240K, and a ultraviolet (UV) sensor 240M. Additionally or alternatively, the sensor module 240 may include an E-nose sensor (not shown), an electromyography (EMG) sensor (not shown), an electroencephalogram (EEG) sensor (not shown), an electrocardiogram (ECG) sensor (not shown), an infrared (IR) sensor, an iris sensor, and/or a fingerprint sensor. The sensor module 240 may further include a control circuit for controlling at least one sensor included therein. In some embodiment, the electronic device 201 may further include a processor configured to control the sensor module 240 as part of or separately from the processor 210, to control the sensor module 240 during a sleep state of the processor 210.

The input device 250 may include, for example, a touch panel 252, a (digital) pen sensor 254, a key 256, or an ultrasonic input device 258. The touch panel 252 may use at least one of a capacitive type, a resistive type, an IR type, or an ultrasonic type. The touch panel 252 may further include a control circuit. The touch panel 252 may further include a tactile layer to provide tactile reaction to the user. The (digital) pen sensor 254 may include a recognition sheet which is a part of the touch panel 252 or a separate recognition sheet. The key 256 may also include a physical button, an optical key, or a keypad. The ultrasonic input device 258 senses ultrasonic waves generated by an input means through a microphone (e.g., the microphone 288) and checks data corresponding to the sensed ultrasonic waves.

The display 260 (e.g., the display 160) may include a panel 262, a hologram device 264, a projector 266, and/or a control circuit for controlling them. The panel 262 may be implemented to be flexible, transparent, or wearable. The panel 262 may be configured with the touch panel 252 in one module. According to an embodiment, the panel 262 may include a pressure sensor (or a "force sensor", interchangeably used hereinafter) capable of measuring a strength of a pressure by a user's touch. The pressure sensor may be implemented integrally with the touch panel 252 or may be implemented as one or more sensors separate from the touch panel 252. The hologram device 264 shows a stereoscopic image in the air by using interference of light. The projector 266 displays an image onto a screen through projection of light. The screen may be positioned inside or outside the electronic device 201. According to an embodiment, the interface 270 may include a high-definition multimedia interface (HDMI) 272, a universal serial bus (USB) 274, an optical communication 276, or a D-subminiature 278. The interface 270 may be included in the communication interface 170 illustrated in FIG. 1. Additionally or alternatively, the interface 270 may include, for example, an MHL interface, an SD card/MMC interface, or an IrDA interface.

The audio module 280 bi-directionally converts sound and an electric signal. At least one element of the audio module 280 may be included in the input/output interface 145 illustrated in FIG. 1. The audio module 280 processes sound information input or output through the speaker 282, the receiver 284, the earphone 286, or the microphone 288. The camera module 291 is, for example, a device capable of capturing a still image or a moving image, and according to an embodiment, may include one or more image sensors (e.g., a front sensor or a rear sensor), a lens, an image signal processor (ISP), or a flash (e.g., an LED, a xenon lamp, etc.). The power management module 295 manages power of the electronic device 201. According to an embodiment, the power management module 295 may include a power management integrated circuit (PMIC), a charger IC, or a battery fuel gauge. The PMIC may have a wired and/or wireless charging scheme. The wireless charging scheme includes a magnetic-resonance type, a magnetic induction type, and an electromagnetic type, and may further include an additional circuit for wireless charging, for example, a coil loop, a resonance circuit, or a rectifier. The battery gauge measures the remaining capacity of the battery 296 or the voltage, current, or temperature of the battery 296 during charging. The battery 296 may include, for example, a rechargeable battery and/or a solar battery.

The indicator 297 displays a particular state, for example, a booting state, a message state, or a charging state, of the electronic device 201 or a part thereof (e.g., the processor 210). The motor 298 converts an electric signal into mechanical vibration or generates vibration or a haptic effect. The electronic device 201 may include a device for supporting the mobile TV (e.g., a GPU) to process media data according to a standard such as digital multimedia broadcasting (DMB), digital video broadcasting (DVB), or mediaFlo™. Each of the foregoing elements described herein may be configured with one or more components, names of which may vary with a type of the electronic device. In various embodiments, some components of the electronic device (e.g., the electronic device 201) may be omitted or may further include other elements, and some of the components may be coupled to form one entity and identically perform functions of the components before being coupled.

Figure 3:
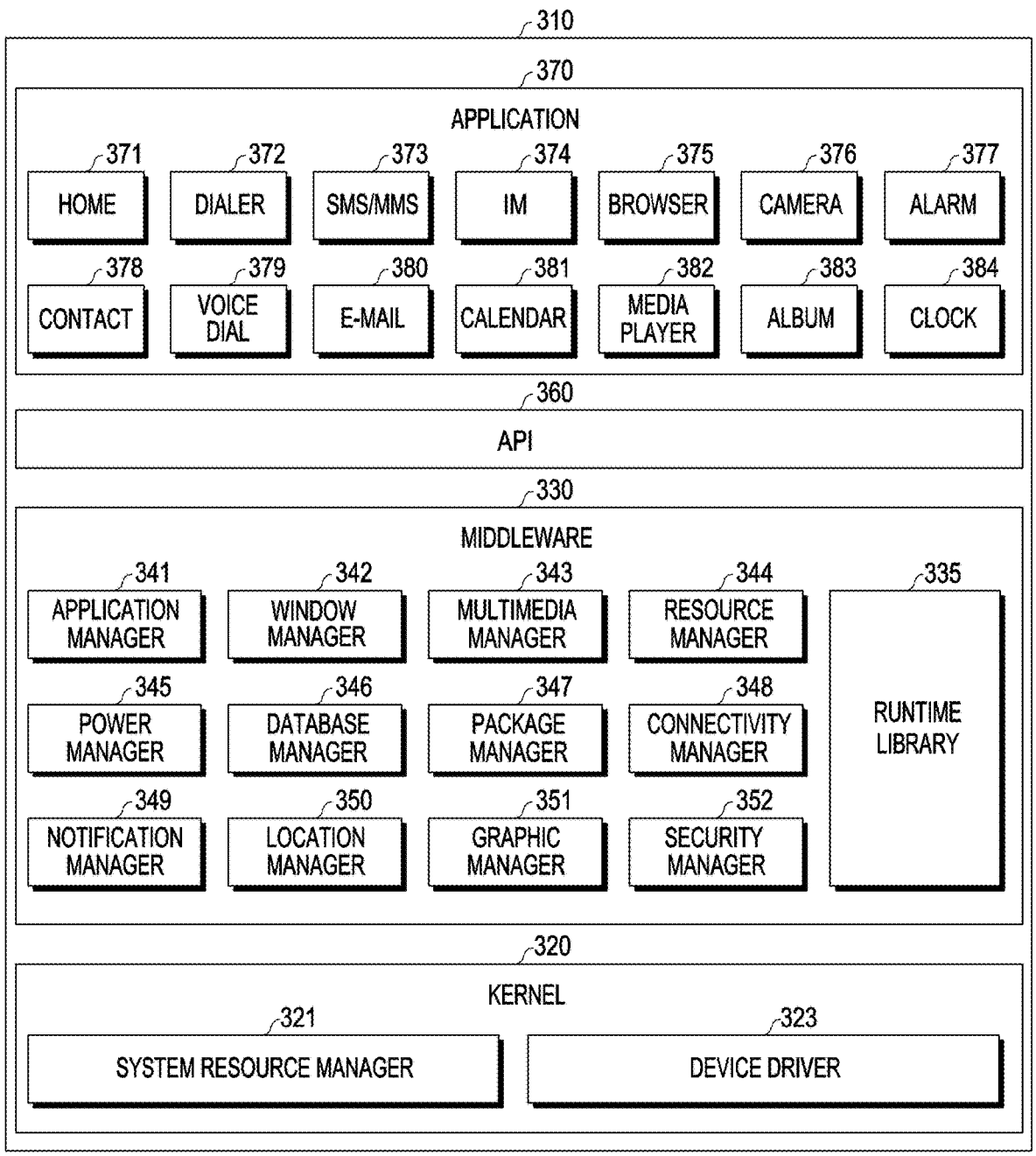
FIG. 3 is a block diagram of a programming module according to various embodiments.

FIG. 3 is a block diagram of a programming module according to various embodiments. According to an embodiment, a programming module 310 (e.g., the program 140) may include an OS for controlling resources associated with an electronic device (e.g., the electronic device 101) and/or various applications (e.g., the application program 147) executed on the OS. The OS may include Android™, iOS™, Window™, Symbian™, Tizen™, or Bada™ Referring to FIG. 3, the programming module 310 may include a kernel 320 (e.g., the kernel 141), middleware 330 (e.g., the middleware 143), an application programming interface (API) 360 (e.g., the API 145), and/or an application 370 (e.g., the application program 147). At least a part of the programming module 310 may be preloaded on an electronic device or may be downloaded from an external device (e.g., the vehicle device 102, the electronic device 104, or the server 106).

The kernel 320 may include a system resource manager 321 and/or a device driver 323. The system resource manager 321 may perform control, allocation, retrieval of system resources, and so forth. According to an embodiment, the system resource manager 321 may include a process management unit, a memory management unit, or a file system management unit. The device driver 323 may include, for example, a display driver, a camera driver, a Bluetooth driver, a shared memory driver, a USB driver, a keypad driver, a WiFi driver, an audio driver, or an inter-process communication (IPC) driver. The middleware 330 may include provide functions that the application 370 commonly requires or provide various functions to the application 370 through the API 360 to allow the application 370 to use a limited system resource in an electronic device. According to an embodiment, the middleware 330 may include at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, and a security manager 352.

The runtime library 335 may include a library module that a compiler uses to add a new function through a programming language while the application 370 is executed. The runtime library 335 performs input/output management, memory management, or calculation function processing. The application manager 341 manages a life cycle of the applications 370. The window manager 342 manages a GUI resource used in a screen. The multimedia manager 343 recognizes a format necessary for playing media files and performs encoding or decoding on a media file by using a codec appropriate for a corresponding format. The resource manager 344 manages a source code or a memory space of the applications 370. The power manager 345 manages a battery or power and provides power information necessary for an operation of the electronic device. According to an embodiment, the power manager 345 may operate with basic input/output system (BIOS). The database manager 346 generates, searches or changes a database used for at least one application among the applications 370. The package manager 347 manages the installation or update of an application distributed in a package file format.

The connectivity manager 348 manages a wireless connection. The notification manager 349 provides an event, e.g., an arriving message, an appointment, proximity notification, etc. The location manager 350 manages location information of an electronic device. The graphic manager 351 manages, for example, a graphic effect to be provided to a user or a user interface relating thereto. The security manager 352 provides, for example, system security or user authentication. According to an embodiment, the middleware 330 may further include a telephony manager for managing a voice or video call function of the electronic device or a middleware module forming a combination of functions of the above-described components. According to an embodiment, the middleware 330 provides a module specified for each type of an OS. Additionally, the middleware 330 may delete some of existing elements or add new elements dynamically. The API 360 may be provided as a set of API programming functions with a different configuration according to the OS. In the case of Android or iOS, for example, one API set may be provided by each platform, and in the case of Tizen, two or more API sets may be provided.

The application 370 may include one or more applications capable of providing a function, for example, a home application 371, a dialer application 372, a short messaging service/multimedia messaging service (SMS/MMS) application 373, an instant message (IM) application 374, a browser application 375, a camera application 376, an alarm application 377, a contact application 378, a voice dial application 379, an e-mail application 380, a calendar application 381, a media player application 382, an album application 383, a clock application 384, a health care application (e.g., an application for measuring an exercise amount, a blood sugar, etc.), or an environment information providing application (e.g., an application for providing air pressure, humidity, or temperature information or the like). According to an embodiment, the application 370 may include an information exchange application supporting information exchange between the electronic device and an external electronic device. The information exchange application may include, for example, a notification relay application for transferring specific information to the external electronic device or a device management application for managing the external electronic device. For example, the notification relay application may deliver notification information generated in another application of the electronic device to an external electronic device or may receive notification information from the external electronic device and provide the notification information to the user. The device management application may manage (e.g., install, remove, or update) a function (e.g., turn on/turn off of an external electronic device itself (or a part thereof) or control of brightness (or resolution) of a display) of an external device communicating with the electronic device, a service provided by an application operating in an external electronic device or provided by the external electronic device (e.g., a call service or a message service). According to an embodiment, the application 370 may include an application (e.g., device health care application of mobile medical equipment) designated according to an attribute of the external electronic device. According to an embodiment, the application 370 may include an application received from the external electronic device. The at least a part of the programming module 310 may be implemented (e.g., executed) by software, firmware, hardware (e.g., the processor 210), or a combination of two or more of them, and may include, for example, modules, programs, routines, sets of instructions, or processes for performing one or more functions.

A term "module" used herein may mean, for example, a unit including one of or a combination of two or more of hardware, software, and firmware, and may be used interchangeably with terms such as logic, a logic block, a part, or a circuit. The "module" may be a part configured integrally, a minimum unit or a portion thereof performing one or more functions. The "module" may be implemented mechanically or electronically, and may include an application-specific integrated circuit (ASIC) chip, field-programmable gate arrays (FPGAs), and a programmable-logic device performing certain operations already known or to be developed. At least a part of an apparatus (e.g., modules or functions thereof) or a method (e.g., operations) according to various embodiments may be implemented with an instruction stored in a computer-readable storage medium (e.g., the memory 130) in the form of a programming module. When the instructions are executed by a processor (for example, the processor 120), the processor may perform functions corresponding to the instructions. The computer-readable recording medium includes hard disk, floppy disk, or magnetic media (e.g., a magnetic tape, optical media (e.g., compact disc read only memory (CD-ROM) or digital versatile disc (DVD), magneto-optical media (e.g., floptical disk), an embedded memory, and so forth. The instructions may include a code generated by a compiler or a code executable by an interpreter. Modules or programming modules according to various embodiments of the present disclosure may include one or more of the foregoing elements, have some of the foregoing elements omitted, or further include additional other elements. Operations performed by the module, the program, or another component according to various embodiments may be carried out sequentially, in parallel, repeatedly, or heuristically, or one or more of the operations may be executed in a different order or omitted, or one or more other operations may be added.

Figure 4:
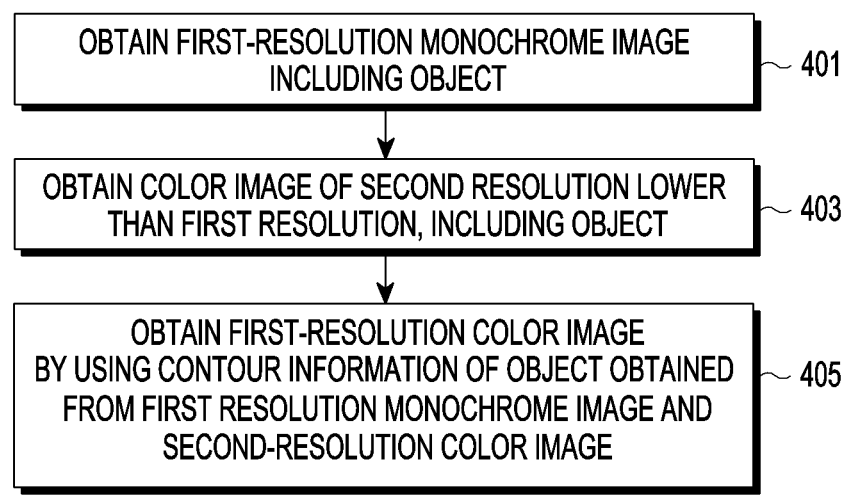
FIG. 4 is a flowchart illustrating a method for controlling a photographing apparatus according to various embodiments of the present disclosure.

FIG. 4 is a flowchart illustrating a method for controlling a photographing apparatus according to various embodiments of the present disclosure.

As illustrated in FIG. 4, according to various embodiments, in operation 401, a processor (e.g., the processor 120) of a photographing apparatus (e.g., the electronic device 101) obtains a monochrome image of a first resolution including an object by using a first camera module.

For example, the photographing apparatus 101 may include the first camera module capable of capturing a monochrome image and a second camera module capable of capturing a color image.

The first camera module and the second camera module may be spaced apart from each other by a preset distance or more.

The first camera module and the second camera module may be provided on the same first surface, while being spaced apart from each other by a preset distance or more.

The first camera module and the second camera module may photograph an object outside the photographing apparatus 101. The first camera module and the second camera module may photograph an external object outside at different viewpoints.

For example, the first camera module may photograph the external object at a first resolution and transmit a first-resolution monochrome image including the object to the processor 120.

For example, the second camera module may photograph the external object at a second resolution and transmit a second-resolution monochrome image including the object to the processor 120.

For example, the first resolution, which is the resolution of the monochrome image, may be higher than the second resolution that is the resolution of the color image. The monochrome image may have a size of 20 M and the color image may have a size of 4 M.

According to various embodiments, in operation 403, the processor 120 of the photographing apparatus 101 obtains a color image of the second resolution including an object by using a second camera module.

According to various embodiments, in operation 405, the processor 120 of the photographing apparatus 101 obtains a first-resolution color image by using contour information of the object obtained from the first-resolution monochrome image and the second-resolution color image.

For example, the processor 120 may obtain the contour information of the object from the first-resolution monochrome image.

The processor 120 may obtain a plurality of color pixels included in a pixel region in the second-resolution color image.

The processor 120 may generate the first-resolution color image by using the contour information extracted from the first-resolution monochrome image and the color pixels included in the second-resolution color image.

According to various embodiments, the processor 120 determines color values of respective pixels of the first-resolution color image by using the extracted contour and color values of respective pixels of the second-resolution color image.

According to various embodiments, the processor 120 generates the first-resolution color image by using the determined color values and the first-resolution monochrome image.

Figure 5:
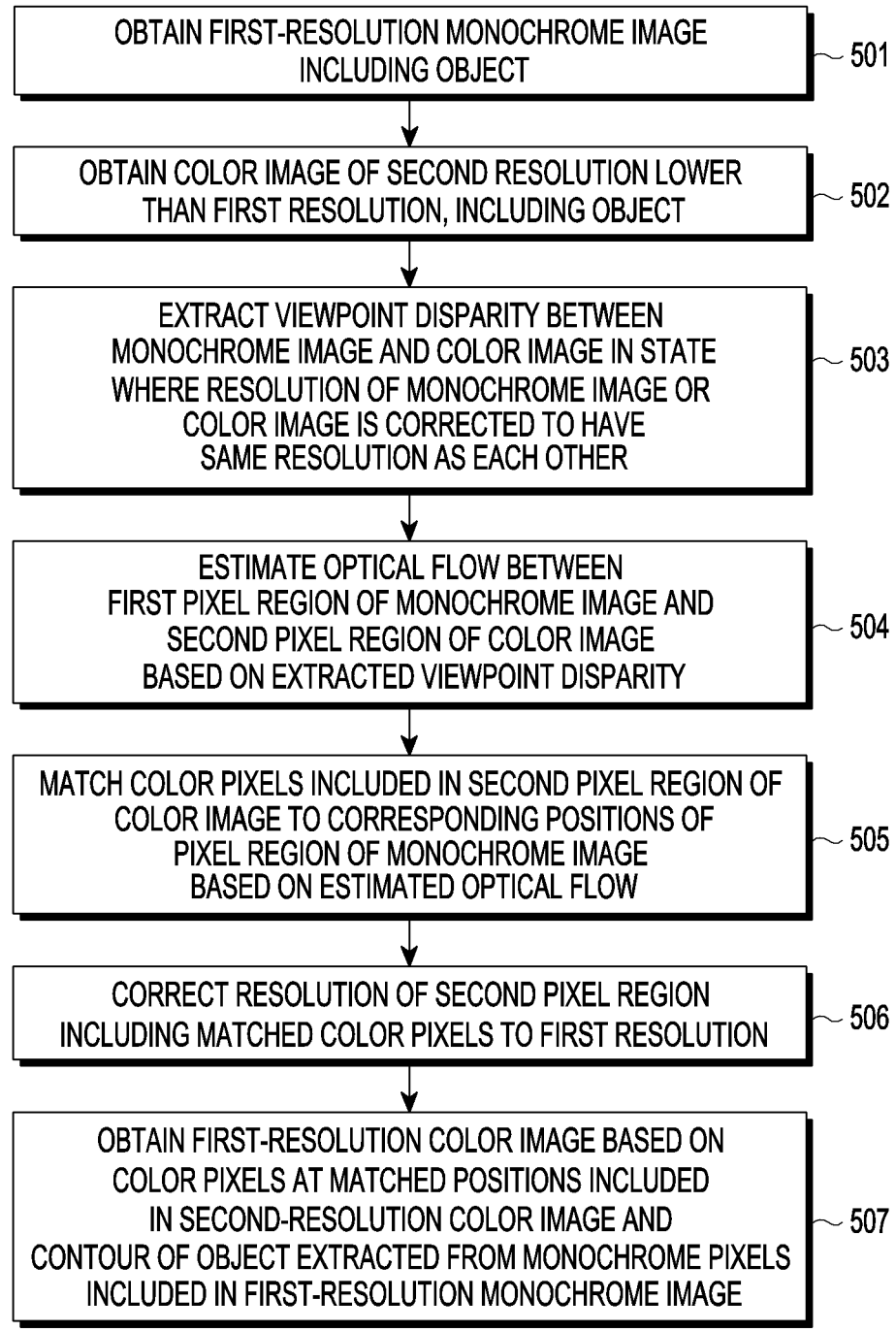
FIG. 5 is a flowchart illustrating a method for obtaining a color image by a photographing device according to various embodiments of the present disclosure.

FIG. 5 is a flowchart illustrating a method for obtaining a color image by a photographing device according to various embodiments of the present disclosure.

As illustrated in FIG. 5, according to various embodiments, in operation 501, a processor (e.g., the processor 120) obtains the monochrome image of the first resolution including an external object outside a photographing apparatus (e.g., the electronic device 101) by using the first camera module.

According to various embodiments, in operation 502, the processor 120 obtains the color image of the second resolution including the external object by using the second camera module.

According to various embodiments, in operation 503, the processor 120 corrects the resolution of the monochrome image or the resolution of the color image such that the resolution of the obtained monochrome image and the resolution of the obtained color image are the same as each other, and extracts a viewpoint disparity between the monochrome image and the color image in the resolution-corrected state.

For example, the processor 120 may reduce the resolution of the obtained monochrome image to the resolution of the color image, and extract the viewpoint disparity between the color image and the monochrome image, the resolution of which is reduced to be the same as that of the color image.

According to various embodiments, in operation 504, the processor 120 estimates an optical flow between a first pixel region of the monochrome image and a second pixel region of the color image, based on the extracted viewpoint disparity.

For example, the processor 120 may estimate a motion vector between the first pixel region of the monochrome image and the second pixel region of the color image, based on the extracted viewpoint disparity.

According to various embodiments, in operation 505, the processor 120 matches color pixels included in the second pixel region of the color image to corresponding positions of the first pixel region of the monochrome image, based on the estimated optical flow.

For example, the processor 120 may match color values of a plurality of pixels included in the second pixel region of the color image to pixels at corresponding positions among pixels of the first pixel region of the monochrome image.

According to various embodiments, in operation 506, the processor 120 corrects a resolution of the second pixel region including the matched color pixels of the color image to the first resolution of the monochrome image.

For example, the processor 120 may up-scale the resolution of the color image such that the resolution of the color image is the same as the first resolution of the monochrome image.

According to various embodiments, in operation 507, the processor 120 obtains the first-resolution color image based on the color pixels at the matched positions included in the second-resolution color image and the contour of the object, extracted from monochrome pixels included in the first-resolution monochrome image.

For example, the number of color pixels at the matched positions included in the second-resolution color image may vary each time when the object is photographed like in operations 501 and 502 or when matching is performed for the color image like in operations 503, 504, and 505.

Figure 6:
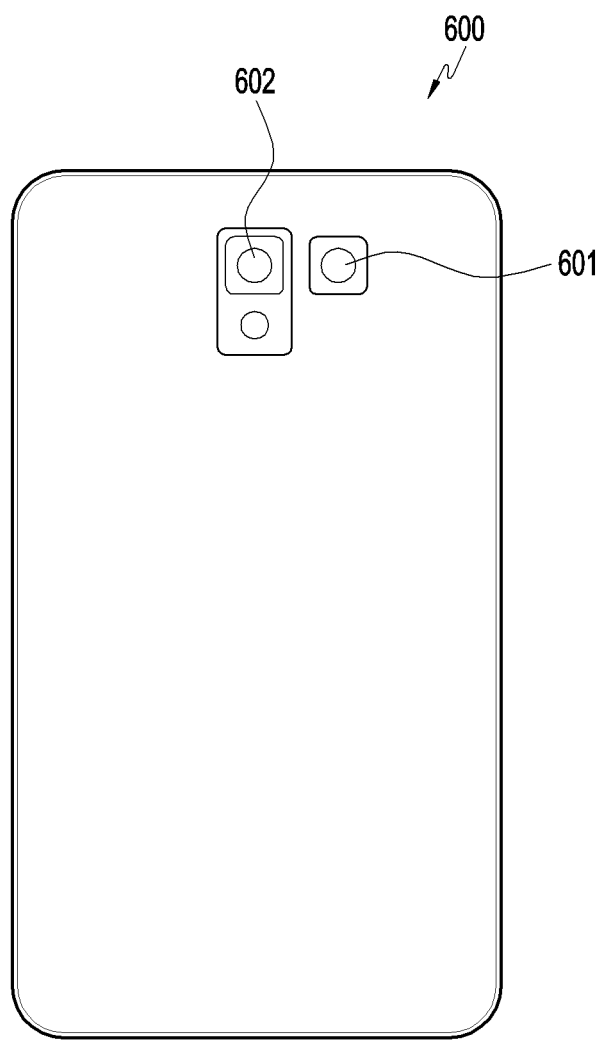
FIG. 6 illustrates a first surface of a photographing apparatus according to various embodiments of the present disclosure.

FIG. 6 illustrates a first surface of a photographing apparatus according to various embodiments of the present disclosure.

As illustrated in FIG. 6, according to various embodiments, a photographing apparatus 600 may include a first camera module 601 capable of capturing a monochrome image at a first resolution (e.g., 20 M) and a second camera module 602 capable of capturing a color image at a second resolution (e.g., 4 M) on the same first surface.

Figure 7:
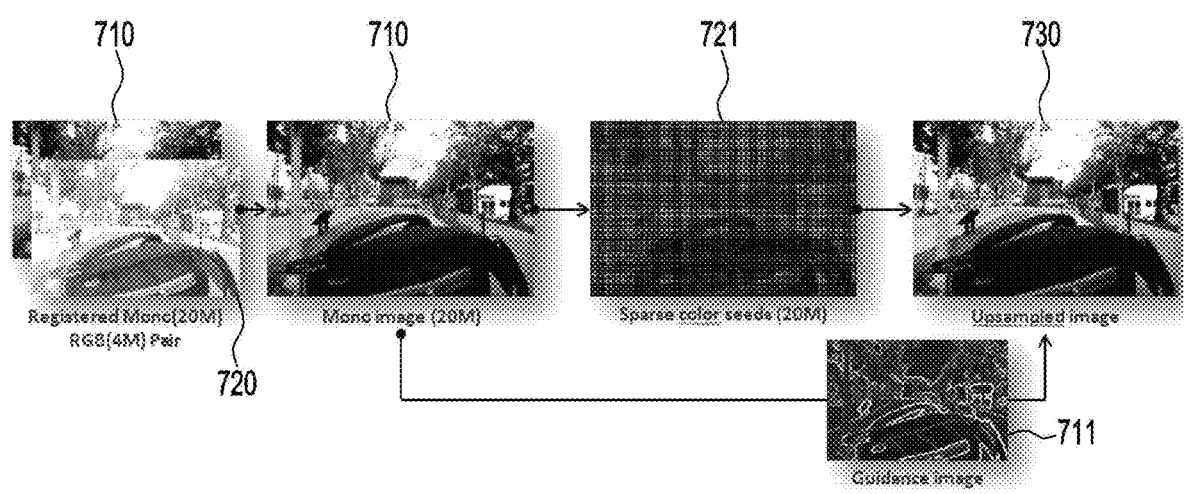
FIG. 7 illustrates a color image generation flow according to various embodiments of the present disclosure.

FIG. 7 illustrates a color image generation flow according to various embodiments of the present disclosure.

As illustrated in FIG. 7, according to various embodiments, a processor (e.g., the processor 120) obtains a monochrome image 710 through a first camera module (e.g., the first camera module 601).

According to various embodiments, the processor 120 obtains a color image 720 through a second camera module (e.g., the first camera module 602).

For example, the monochrome image 710 may be captured at a first viewpoint and the color image 720 may be captured at a second viewpoint.

According to various embodiments, the processor 120 extracts the first viewpoint of the monochrome image 710 and the second viewpoint of the color image 720.

According to various embodiments, the processor 120 extracts the difference between the first viewpoint and the second viewpoint.

According to various embodiments, the processor 120 estimates an optical flow between the first pixel region of the monochrome image 710 and the second pixel region of the color image 720 based on the extracted difference between the first viewpoint and the second viewpoint.

According to various embodiments, the processor 120 matches color pixels included in the second pixel region of the color image 720 to corresponding positions of the first pixel region of the monochrome image 710, based on the estimated optical flow.

According to various embodiments, the processor 120 corrects the resolution of the second pixel region including the matched color pixels to the first resolution that is the same as that of the black image 710, thereby obtaining a color image 721 up-scaled to the first resolution.

According to various embodiments, the processor 120 extracts a plurality of color pixels from the color image 721 up-scaled to the first resolution.

According to various embodiments, the processor 120 extracts contour information 711 of an object from monochrome pixels included in the first-resolution monochrome image 710.

According to various embodiments, the processor 120 determines pixel values of remaining pixels among the plurality of extracted color pixels based on the plurality of color pixels and the contour information.

According to various embodiments, the processor 120 determines color values of respective pixels of the first-resolution color image by using the extracted contour and color values of respective pixels of the second-resolution color image.

According to various embodiments, the processor 120 generates the first-resolution color image by using the determined color values and the first-resolution monochrome image.

According to various embodiments, the processor 120 obtains a first-resolution color image 730 based on the plurality of color pixels the determined pixel values of the remaining pixels.

Figure 8A:
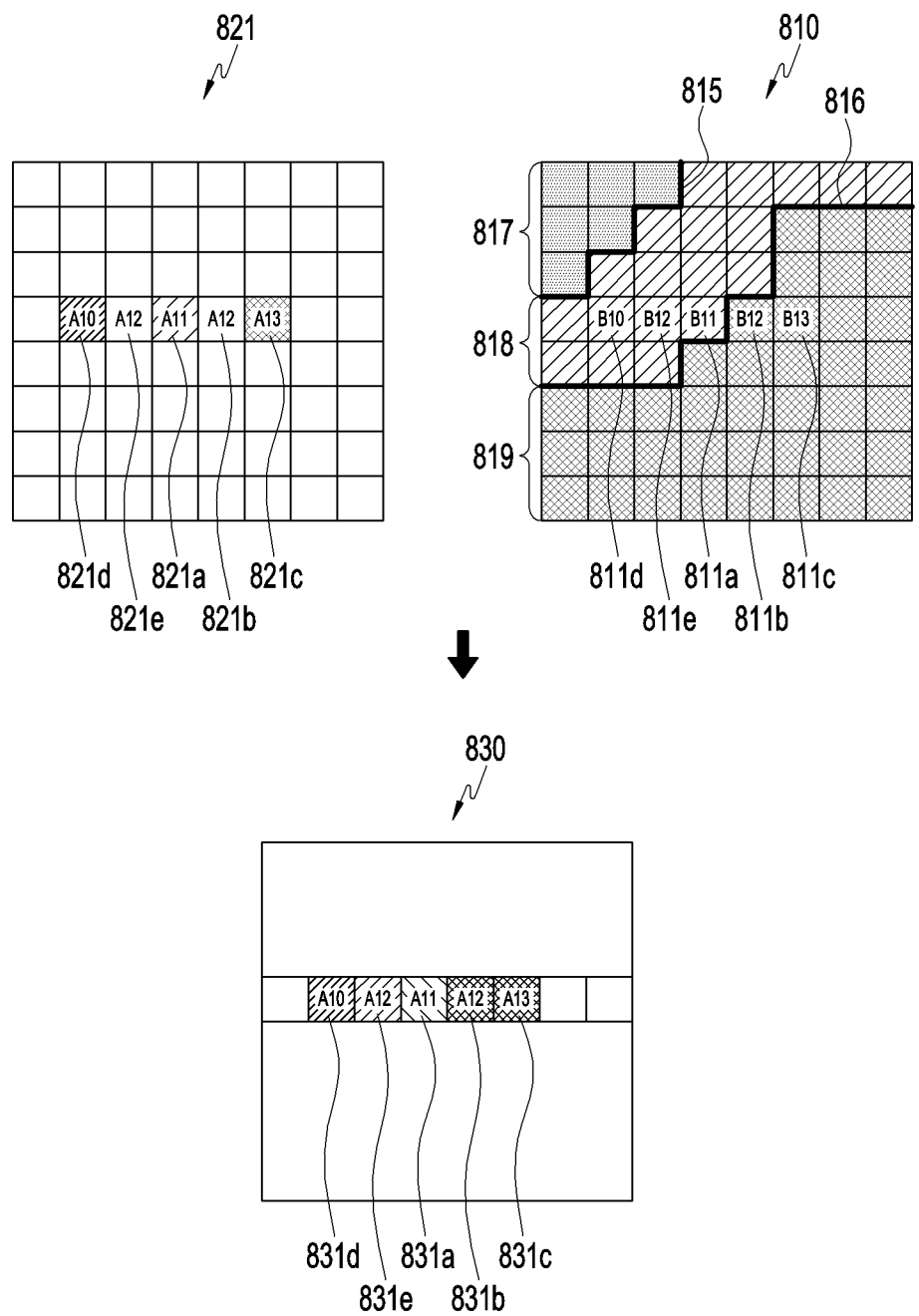
FIG. 8A is a view for illustrating a method for determining pixels of an up-scaled color image according to various embodiments of the present disclosure.
Figure 8B:
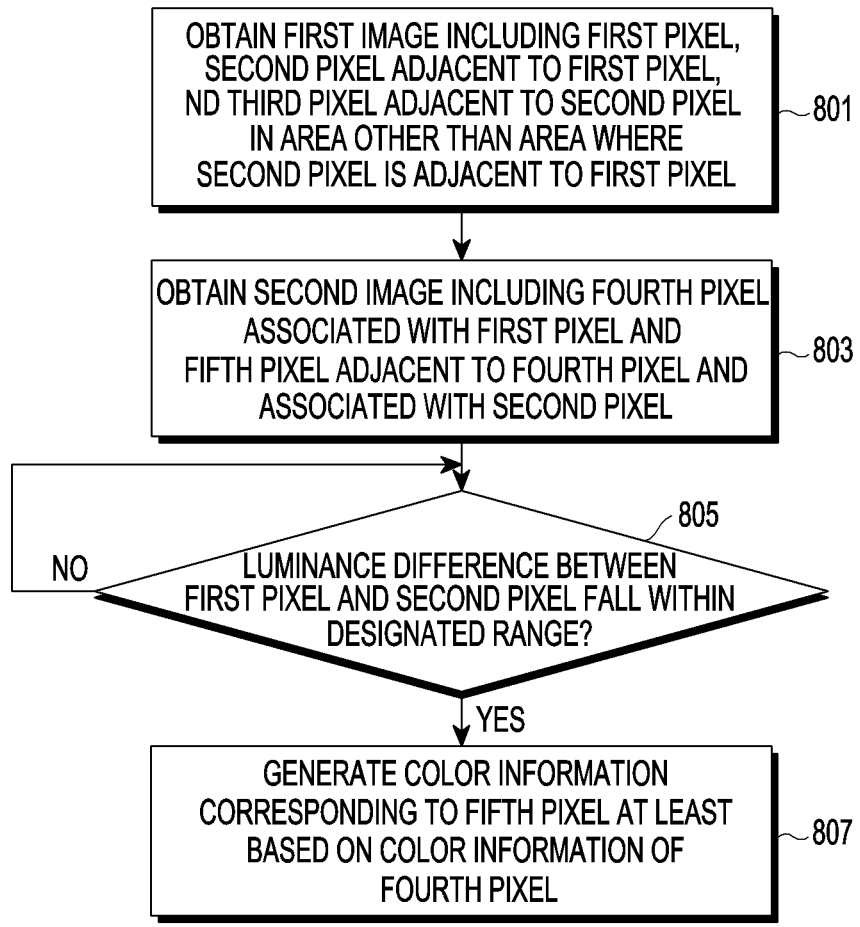
FIG. 8B is a flowchart illustrating a method for extracting pixel values of remaining pixels among a plurality of color pixels extracted from an up-scaled color image according to various embodiments of the present disclosure.

FIG. 8A is a view for illustrating a method for determining pixels of an up-scaled color image according to various embodiments of the present disclosure, and FIG. 8B is a flowchart illustrating a method for extracting pixel values of remaining pixels A12 821e and 821b among a plurality of color pixels A10, A11, and A13 extracted from an up-scaled color image 821 according to various embodiments of the present disclosure.

According to various embodiments, a processor (e.g., the processor 120) matches positions of the plurality of pixels A10, A11, and A13 in a pixel region of a color image (e.g., the color image 720) to corresponding positions of pixels B10, B11, and B13 in a pixel region of a monochrome image 810.

According to various embodiments, the processor 120 up-scales the resolution of the color image 720 including the second pixel region including the color pixels A10, A11, and A13 at the matched positions to the first resolution of the monochrome image 810 including the first pixel region, thereby obtaining a color image 821 (e.g., the color image 721) up-scaled to the first resolution.

According to various embodiments, the processor 120 extracts the plurality of color pixels A10, A11, and A13 from the up-scaled color image 821.

According to various embodiments, the processor 120 extracts contour information 815 and 816 from the first pixel region of the monochrome image 810.

According to various embodiments, the processor 120 determines pixel values of the remaining pixels A12 821e and 821b among the plurality of extracted color pixels A10, A11, and A13 in the up-scaled color image 821 by using the extracted contour information 815 and 816.

With reference to FIGS. 8A and 8B, a detailed description will be made of a method for extracting pixel values of the remaining pixels A12 821e and 821b among the plurality of extracted color pixels A10, A11, and A13 in the up-scaled color image 821 according to various embodiments. As illustrated in FIG. 8B, in operation 801, according to various embodiments, the processor 120, by using a first image sensor (e.g., the first camera module 601), obtains the first image 810 including a first pixel B11 811a, second pixels B12 811e and 811b that are adjacent to the first pixel B11 811a, and third pixels B10 811d and B13 811c that are adjacent to the second pixels B12 811e and 811b in an area other than an area where the second pixels B12 811e and 811b are adjacent to the first pixel B11 811a.

In operation 803, according to various embodiments, the processor 120, by using a second image sensor (e.g., the second camera module 602) and the first image 810, obtains the second image 821 including a fourth pixel A11 821a associated based on a position of the first pixel B11 811a, and fifth pixels A12 821e and 821b that are adjacent to the fourth pixel A11 821a and are associated based on positions of the second pixels B12 811e and 811b.

In operation 805, according to various embodiments, the processor 120 determines whether luminance differences between the first pixel B11 811a and the second pixels B12 811e and 811b fall in a designated range. For example, the processor 120 may determine whether the luminance differences between the first pixel B11 811a and the second pixels B12 811e and 811b fall in the designated range, in the manner described below.

According to various embodiments, the processor 120 determines whether the contour 815 or 816 exists between the first pixel B11 81/a and the second pixels B12 811e and 811b. For example, in FIG. 8A, there is no contour information between the pixels 811a and 811e, and there exists the contour information 816 between the pixels 811a and 811b. According to various embodiments, the processor 120 determines whether luminance differences between the first pixel B11 811a and the second pixels B12 811e and 811b fall in the designated range, based on whether the contour information exists. For example, the processor 120 may determine that the luminance difference between the pixels 811a and 811e falls within the designated range and the luminance difference between the pixels 811a and 811b does not fall within the designated range.

According to various embodiments, the processor 120 determines whether the first pixel B11 811a and the second pixels B12 811e and 811b are located in the same region 817, 818, or 819. For example, in FIG. 8A, the pixels 811e and 811a are located in the same region 818, and the pixels 811a and 811b are located in the different regions 818 and 819. According to various embodiments, the processor 120 determines whether the luminance differences between the first pixel B11 811a and the second pixels B12 811e and 811b fall in the designated range, based on whether the first pixel B11 811a and the second pixels B12 811e and 811b are located in the same region 817, 818, or 819. For example, the processor 120 may determine that the luminance difference between the pixels 811a and 811e falls within the designated range and the luminance difference between the pixels 811a and 811b does not fall within the designated range.

In operation 807, according to various embodiments, when the luminance differences between the first pixel B11 811a and the second pixels B12 811e and 811b fall in the designated range, the processor 120 generates color information corresponding to at least one of the first pixel B11 811a and the second pixels B12 811e and 811b, at least based on color information of the fourth pixel A11 821a and the fifth pixels A12 821e and 821b.

According to various embodiments, the second image 821 may further include sixth pixels A10 and A13 821d and 821c, which are associated based on positions of the third pixels B10 and B13 811d and 811c and are adjacent to the fifth pixels A12 821e and 821b in an area other than an area where the fifth pixels A12 812e and 812b are adjacent to the fourth pixel A11 821a.

According to various embodiments, when the luminance differences between the first pixel B11 811a and the second pixels B12 811e and 811b fall in another designated range, the processor 120 generates color information corresponding to at least one of the second pixels B12 811e and 811b and the third pixels B10 and B13 811d and 811c, at least based on color information of the sixth pixels A10 and A13 821d and 821c and color information of the fifth pixels A12 821e and 821b.

According to various embodiments, when the luminance differences between the first pixel B11 811a and the third pixels B10 and B13 811d and 811c fall in the designated range, the processor 120 generates color information corresponding to at least one of the first pixel B11 811a, the second pixels B12 811e and 811b, and the third pixels B10 and B13 811d and 811c by using the color information of the fourth pixel A11 821a and the color information of the sixth pixels A10 and A13 821d and 821c, based on at least one distance information between the fifth pixels A12 821e and 821b and the fourth pixel A11 821a and at least one distance information between the fifth pixels A12 821e and 821b and the sixth pixels A10 and A13 821d and 821c.

According to various embodiments, generation of color information corresponding to at least one of the first pixel and the second pixel of the first image may include spreading color information corresponding to the fifth pixels A12 821e and 821b in a first direction in which the fifth pixels A12 821e and 821b are arranged from the fourth pixel A11 821a, by using the color information of the fourth pixel A11 821a.

According to various embodiments, generation of color information corresponding to at least one of the second pixel and the third pixel may include spreading color information corresponding to the fifth pixels A12 821e and 821b in a second direction in which the fifth pixels A12 821e and 821b are arranged from the sixth pixels A10 and A13 821*d* and 821*c*, by using the color information of the sixth pixels A10 and A13 821*d* and 821*c*.

Figure 9:
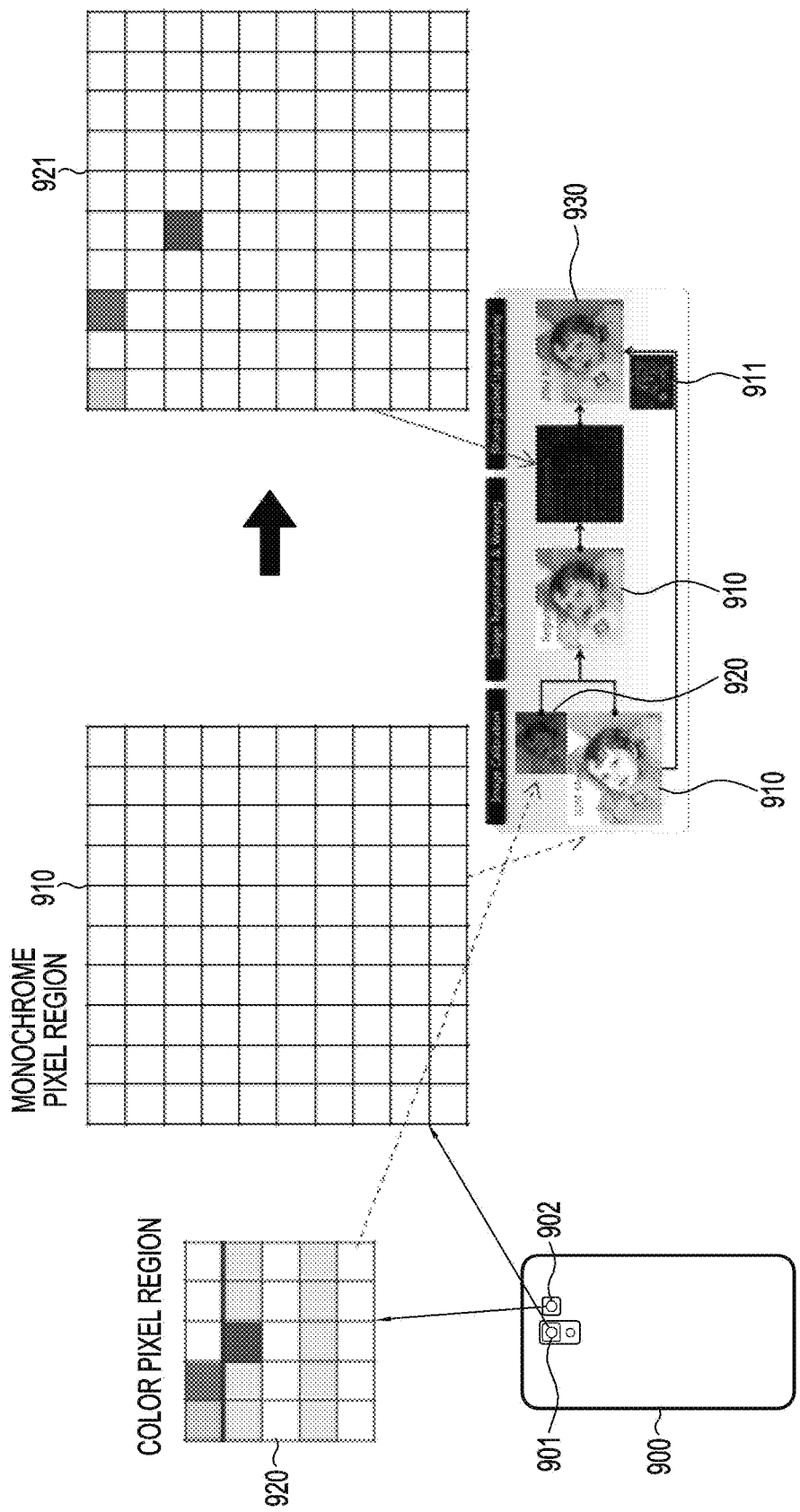
FIG. 9 illustrates a pixel region and a color image generation flow according to various embodiments of the present disclosure.

FIG. 9 illustrates a pixel region and a color image generation flow according to various embodiments of the present disclosure.

As illustrated in FIG. 9, according to various embodiments, a processor (e.g., the processor 120) up-scales a color image 920 obtained using a second camera module 902 of a photographing apparatus 900 to a first resolution of a monochrome image 910 obtained using a first camera module 901, thus obtaining a color image 921.

According to various embodiments, the processor 120 obtains a first-resolution color image 930 from the up-scaled color image 921 by using contour information 911 extracted from a first-resolution monochrome image 910.

Figure 10:
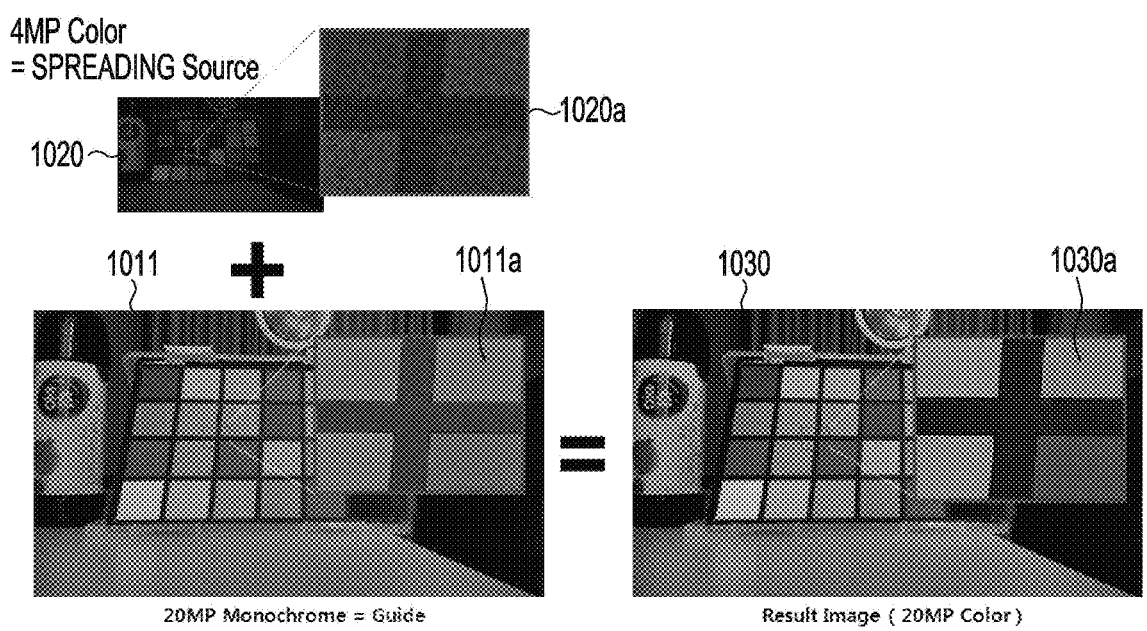
FIG. 10 is a view for describing a method for generating a color image in a low-illumination environment according to various embodiments of the present disclosure.

FIG. 10 is a view for describing a method for generating a color image in a low-illumination environment according to various embodiments of the present disclosure.

As illustrated in FIG. 10, according to various embodiments, in an environment of a lower illumination than a preset illumination (e.g., a low-illumination environment), a processor (e.g., the processor 120) obtains a color image 1030 of a 20 MP resolution (a first resolution) by using a color image 1020 of a 4 MP resolution (a second resolution) (a spread source) and a monochrome image 1011 of a 20 MP resolution (the first resolution).

For example, the processor 120 may obtain a third pixel region 1030*a* in a first-resolution color image 1030 from a second pixel region 1020*a* in the second-resolution color image 1020 by using pixel values (e.g., blue, pink, green, red, and black) of a plurality of pixels in the second pixel region 1020*a* and contour information (e.g., a cross shape) of a first pixel region 1010*a* in a first-resolution monochrome image 1010.

Figure 11:
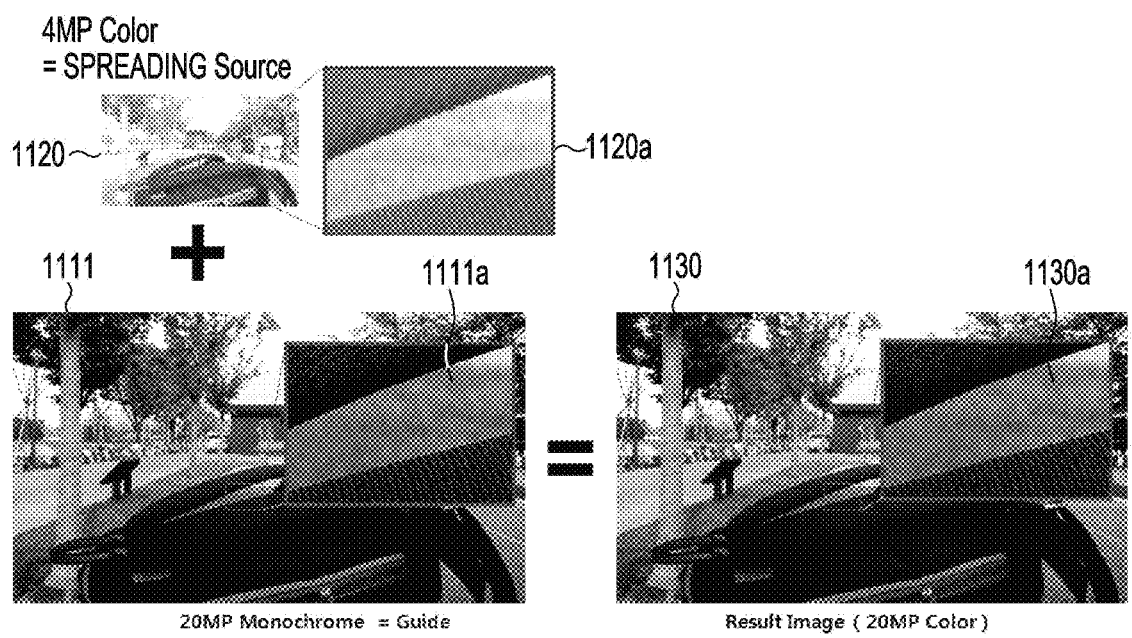
FIG. 11 is a view for describing a method for generating a color image in an environment including a viewpoint disparity according to various embodiments of the present disclosure.

FIG. 11 is a view for describing a method for generating a color image in an environment including a viewpoint disparity according to various embodiments of the present disclosure.

As illustrated in FIG. 11, according to various embodiments, a processor (e.g., the processor 120) corrects a resolution of a monochrome image 1111 from a 20 MP resolution to a 4 MP resolution of a color image 1120, extracts a viewpoint disparity between the monochrome image 1111 of the corrected 4 MP resolution and the 4 MP-resolution color image 1120, estimates an optical flow (a motion vector) between the 4 MP-resolution color image 1120 and the 4 MP-resolution monochrome image 1111 based on the extracted viewpoint disparity, and matches positions of pixels in the 4 MP-resolution color image 1120 to corresponding positions of a pixel region of the 20 MP-resolution monochrome image 1111.

According to various embodiments, the processor 120 obtains a color image 1130 of the 20 MP resolution (a first resolution) by using the color image 1120 of the 4 MP resolution (a second resolution) (a spread source) and a monochrome image 1111 of the 20 MP resolution (the first resolution).

For example, the processor 120 may obtain a third pixel region 1130*a* in a first-resolution color image 1130 from a second pixel region 1120*a* in the second-resolution color image 1120 by using pixel values (e.g., blue, pink, green, red, and black) of a plurality of pixels in the second pixel region 1120*a* and contour information (e.g., a cross shape) of a first pixel region 1111*a* in a first-resolution monochrome image 1111.

Figure 12:
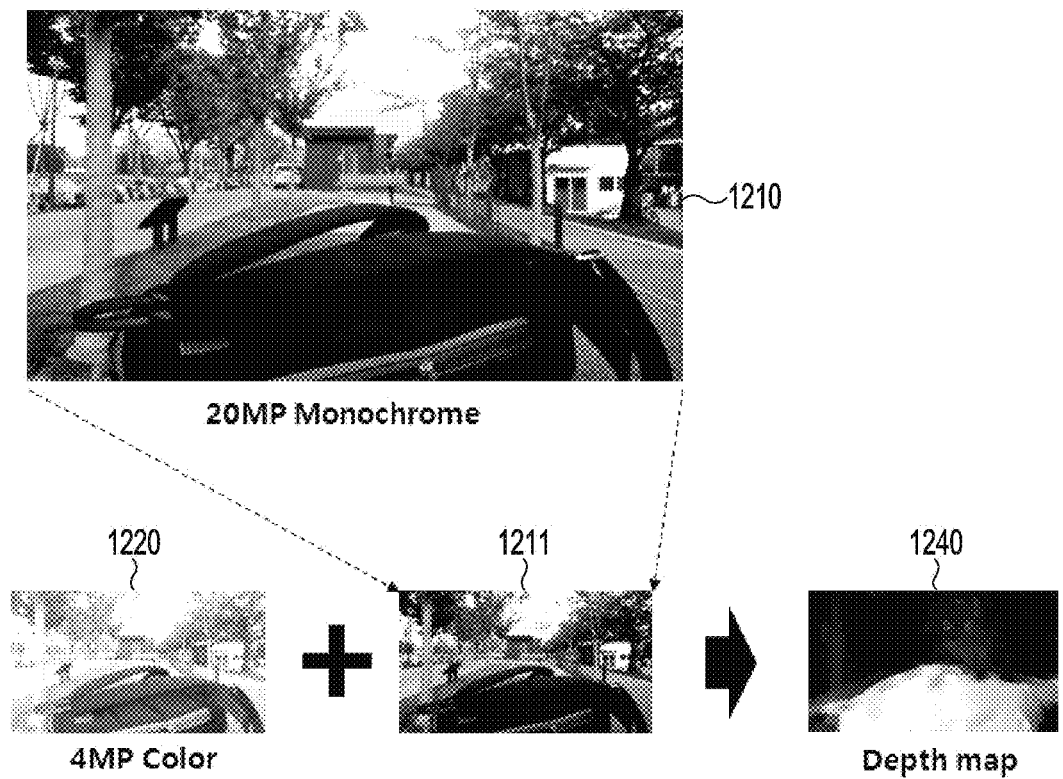
FIG. 12 illustrates a map information extraction flow according to various embodiments of the present disclosure.
Figure 13:
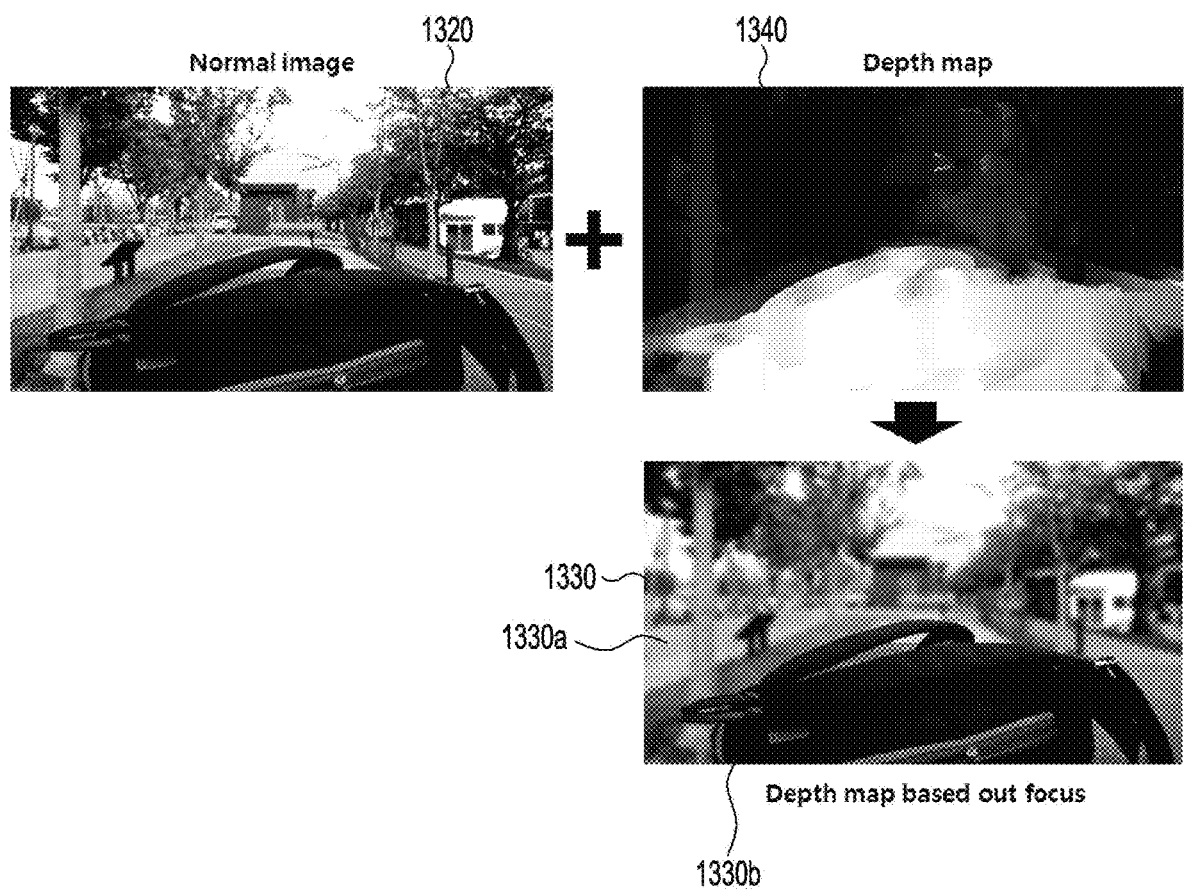
FIG. 13 illustrates a flow of reflecting extracted depth map information to a color image of a first resolution.

FIG. 12 illustrates a map information extraction flow according to various embodiments of the present disclosure, and FIG. 13 illustrates a flow of reflecting extracted depth map information to a color image of a first resolution.

As illustrated in FIG. 12, according to various embodiments, a processor (e.g., the processor 120) extracts contour information 1211 from a 20 MP-resolution monochrome image 1210 obtained through a first camera module (e.g., the first camera module 601).

According to various embodiments, the processor 120 extracts the contour information 1211 from the 20 MP-resolution monochrome image 1210 obtained through the first camera module 601 and obtains depth map information 1240 including perspective information about the object in a color image and/or monochrome image including the object, by using the extracted contour information 1211 and a 4 MP-resolution color image 1220 obtained through a second camera module (e.g., the second camera module 602).

As illustrated in FIG. 13, according to various embodiments, the processor 120 obtains a color image 1320 of a particular resolution (e.g., the first resolution or 20 MP, a high resolution) and a color image 1330 of a particular resolution, to which the perspective information is reflected using the obtained depth map information 1340.

For example, the color image 1330 of the particular resolution to which the perspective information is reflected may include perspective information between an object 1330*b* located in a short range and a background 1330*a* located in a longer range than the object 1330*b*.

Figure 14:
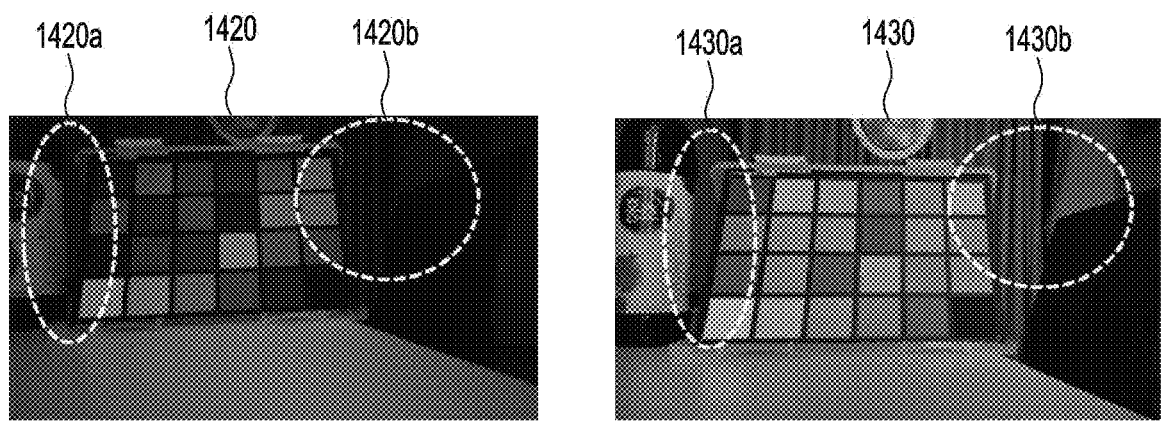
FIG. 14 illustrates a resolution difference between a color image and a monochrome image in a low-illumination environment according to various embodiments of the present disclosure.

FIG. 14 illustrates a resolution difference between a color image and a monochrome image in a low-illumination environment according to various embodiments of the present disclosure.

As illustrated in FIG. 14, according to various embodiments, a processor (e.g., the processor 120) of a photographing apparatus (e.g., the photographing apparatus 600) obtains a monochrome image 1430 of a high resolution (e.g., 20 MP) by using a first camera module (e.g., the first camera module 601, a monochrome camera).

According to various embodiments, the processor 120 of the photographing apparatus 600 obtains a color image 1420 of a low resolution (e.g., 40 MP) by using a second camera module (e.g., the second camera module 602, a color camera).

For example, a first pixel region 1430*a* and a second pixel region 1430*b* of a high-resolution monochrome image 1430 may include accurate color values in a lower-illumination environment than a third pixel region 1420*a* corresponding to the first pixel region 1430*a* or a fourth pixel region 1420*b* corresponding to the second pixel region 1430*b* in the low-resolution color image 1420.

According to various embodiments, a photographing apparatus includes a first image sensor, a second image sensor, and at least one processor functionally connected with the first image sensor and the second image sensor, in which the at least one processor is further configured to obtain a first image including a first pixel, a second pixel adjacent to the first pixel, and a third pixel adjacent to the second pixel in an area other than an area where the second pixel is adjacent to the first pixel, by using the first image sensor, to obtain a second image including a fourth pixel associated based on a position of the first pixel and a fifth pixel that is adjacent to the fourth pixel and associated based on a position of the second pixel, by using the second image sensor, to determine whether a luminance difference between the first pixel and the second pixel falls within a designated range, and to generate color information corresponding to at least one of the first pixel and the second pixel, at least based on color information of the fourth pixel and color information of the fifth pixel, when the luminance difference between the first pixel and the second pixel falls within the designated range.

According to various embodiments, the second image further includes a sixth pixel which is adjacent to the fifth pixel in an area other than an area where the fifth pixel is adjacent to the fourth pixel and which is associated based on a position of the third pixel, and the processor is further configured to generate color information corresponding to at least one of the second pixel and the third pixel, at least based on color information of the sixth pixel and color information of the fifth pixel, when the luminance difference between the first pixel and the second pixel falls within another designated range.

According to various embodiments, the second image further includes a sixth pixel which is adjacent to the fifth pixel in an area other than an area where the fifth pixel is adjacent to the fourth pixel and which is associated based on a position of the third pixel, and the processor is further configured to generate color information corresponding to at least one of the first pixel, the second pixel, and the third pixel by using color information of the fourth pixel and color information of the sixth pixel, based on at least one distance information between the fifth pixel and the fourth pixel and at least one distance information between the fifth pixel and the sixth pixel, when the luminance difference between the first pixel and the third pixel falls within the designated range.

According to various embodiments, the generation of the color information corresponding to the at least one of the first pixel and the second pixel of the first image includes spreading color information corresponding to the fifth pixel in a first direction in which the fifth pixel is arranged from the fourth pixel, by using the color information of the fourth pixel.

According to various embodiments, the generation of the color information corresponding to the at least one of the second pixel and the third pixel of the first image includes spreading color information corresponding to the fifth pixel in a second direction in which the fifth pixel is arranged from the sixth pixel, by using the color information of the sixth pixel.

According to various embodiments, a photographing apparatus includes a first camera module configured to obtain a monochrome image of a first resolution, including an object, a second camera module configured to obtain a color image of a second resolution lower than the first resolution, which includes the object, and a processor configured to obtain a color image of the first resolution by using contour information of the object obtained from the monochrome image of the first resolution and the color image of the second resolution.

According to various embodiments, the processor is configured to obtain a plurality of first pixels from the color image of the second resolution.

According to various embodiments, the processor is configured to correct a resolution of the color image from the second resolution to the first resolution.

According to various embodiments, the processor is configured to extract a contour of the object obtained from the monochrome image of the first resolution.

According to various embodiments, the processor is further configured to determine color values of respective pixels of the first-resolution color image by using the extracted contour and color values of respective pixels of the second-resolution color image.

According to various embodiments, the processor is further configured to generate the first-resolution color image by using the determined color values and the first-resolution monochrome image.

According to various embodiments, a method for controlling a photographing apparatus includes obtaining a first image including a first pixel, a second pixel adjacent to the first pixel, and a third pixel adjacent to the second pixel in an area other than an area where the second pixel is adjacent to the first pixel, obtaining a second image including a fourth pixel associated based on a position of the first pixel and a fifth pixel that is adjacent to the fourth pixel and associated based on a position of the second pixel, determining whether a luminance difference between the first pixel and the second pixel falls within a designated range, and generating color information corresponding to at least one of the first pixel and the second pixel, at least based on color information of the fourth pixel and color information of the fifth pixel, when the luminance difference between the first pixel and the second pixel falls within the designated range.

According to various embodiments, the second image further includes a sixth pixel which is adjacent to the fifth pixel in an area other than an area where the fifth pixel is adjacent to the fourth pixel and which is associated based on a position of the third pixel, and the processor is further configured to generate color information corresponding to at least one of the second pixel and the third pixel, at least based on color information of the sixth pixel and color information of the fifth pixel, when the luminance difference between the first pixel and the second pixel falls within another designated range.

According to various embodiments, the second image further includes a sixth pixel which is adjacent to the fifth pixel in an area other than an area where the fifth pixel is adjacent to the fourth pixel and which is associated based on a position of the third pixel, and the processor is further configured to generate color information corresponding to at least one of the first pixel, the second pixel, and the third pixel by using color information of the fourth pixel and color information of the sixth pixel, based on at least one distance information between the fifth pixel and the fourth pixel and at least one distance information between the fifth pixel and the sixth pixel, when the luminance difference between the first pixel and the third pixel falls within the designated range.

According to various embodiments, the generating of the color information corresponding to the at least one of the first pixel and the second pixel of the first image includes spreading color information corresponding to the fifth pixel in a first direction in which the fifth pixel is arranged from the fourth pixel.

According to various embodiments, the generating of the color information corresponding to the at least one of the second pixel and the third pixel of the first image includes spreading color information corresponding to the fifth pixel in a second direction in which the fifth pixel is arranged from the sixth pixel, by using the color information of the sixth pixel.

According to various embodiments of the present disclosure, a method for controlling a photographing apparatus includes obtaining a monochrome image of a first resolution, including an object, obtaining a color image of a second resolution lower than the first resolution, which includes the object, and obtaining a color image of the first resolution by using contour information of the object obtained from the monochrome image of the first resolution and the color image of the second resolution.

According to various embodiments, the processor is configured to obtain a plurality of first pixels from the color image of the second resolution.

According to various embodiments, the processor is configured to correct a resolution of the color image from the second resolution to the first resolution.

According to various embodiments, the processor is configured to extract a contour of the object obtained from the monochrome image of the first resolution.

According to various embodiments, the processor is further configured to determine color values of respective pixels of the first-resolution color image by using the extracted contour and color values of respective pixels of the second-resolution color image.

According to various embodiments, the processor is further configured to generate the first-resolution color image by using the determined color values and the first-resolution monochrome image.

A term "module" used herein may mean, for example, a unit including one of or a combination of two or more of hardware, software, and firmware. The "module" may be interchangeably used with a unit, a logic, a logical block, a component, or a circuit. The "module" may be a minimum unit or a portion of an integrated component. The "module" may be a minimum unit or part thereof, adapted to perform one or more functions. The "module" may be implemented mechanically or electronically. For example, the "module" according to the embodiments may include at least one of an application-specific integrated circuit (ASIC) chip, field-programmable gate arrays (FPGAs), and a programmable-logic device performing certain operations already known or to be developed.

At least a part of an apparatus (e.g., modules or functions thereof) or a method (e.g., operations) according to various embodiments may be implemented with instructions stored in a computer-readable storage medium in the form of a programming module. When the instructions are executed by one or more processors (for example, the processor 120), the one or more processors may perform functions corresponding to the instructions. The computer-readable storage medium may be, for example, a memory included in the memory 130.

The computer readable recording medium includes hard disk, floppy disk, or magnetic media (e.g., a magnetic tape, optical media (e.g., compact disc read only memory (CD-ROM) or digital versatile disc (DVD), magneto-optical media (e.g., floptical disk), a hardware device (e.g., ROM, RAM, flash memory, etc.), and so forth. Further, the program instructions include a machine language code created by a complier and a high-level language code executable by a computer using an interpreter. The foregoing hardware device may be configured to be operated as at least one software module to perform an operation of the present disclosure, or vice versa.

Modules or programming modules according to various embodiments of the present disclosure may include one or more of the foregoing elements, have some of the foregoing elements omitted, or further include additional other elements. Operations performed by the modules, the programming modules or other elements according to various embodiments may be executed in a sequential, parallel, repetitive or heuristic manner. Also, some of the operations may be executed in different order or omitted, or may have additional different operations. The embodiments disclosed herein have been provided for description and understanding of disclosed technical matters, and are not intended to limit the scope of the present disclosure. Therefore, it should be construed that the scope of the present disclosure includes any change or other various embodiments based on the technical spirit of the present disclosure.

The invention claimed is:
1. A photographing apparatus comprising:
a first image sensor;
a second image sensor; and
at least one processor functionally connected with the first image sensor and the second image sensor,
wherein the at least one processor is further configured to:
obtain a first image having a first resolution by using the first image sensor;
obtain a second image having a second resolution lower than the first resolution by using the second image sensor;
obtain an upscaled second image by upscaling the second resolution of the second image to the first resolution, wherein the upscaled second image includes a first pixel of which color information is extracted from the second image of the second resolution and a second pixel generated by upscaling the second resolution of the second image, the second pixel being adjacent to the first pixel;
determine, based on a viewpoint disparity between the first image and the upscaled second image, a third pixel in the first image, a position of the third pixel corresponding to a position of the first pixel in the upscaled second image, and a fourth pixel in the first image, the fourth pixel being adjacent to the third pixel and a position of the fourth pixel corresponding to a position of the second pixel in the upscaled second image;
determine whether a luminance difference between the third pixel and the fourth pixel falls within a designated range; and
generate color information corresponding to the second pixel at least based on color information of the first pixel when the luminance difference between the third pixel and the fourth pixel falls within the designated range.

2. The photographing apparatus of claim 1, wherein the upscaled second image further comprises a fifth pixel which is adjacent to the second pixel in an area other than an area where the second pixel is adjacent to the first pixel, a position of the fifth pixel corresponding to a position of a sixth pixel in the first image which is adjacent to the fourth pixel in an area other than an area where the fourth pixel is adjacent to the third pixel, color information corresponding to the fifth pixel being extracted from the second image of the second resolution, and
the processor is further configured to generate color information corresponding to the second pixel at least based on color information of the forth pixel and color information of the sixth pixel, when the luminance difference between the third pixel and the fourth pixel falls within another designated range.

3. The photographing apparatus of claim 1, wherein the upscaled second image further comprises a fifth pixel which is adjacent to the second pixel in an area other than an area where the second pixel is adjacent to the first pixel, a position of the fifth pixel corresponding to a position of a sixth pixel in the first image which is adjacent to the fourth pixel in an area other than an area where the fourth pixel is adjacent to the third pixel, color information corresponding to the fifth pixel being extracted from the second image of the second resolution, and the processor is further configured to generate color information corresponding to the second pixel by using color information of the first pixel and color information of the fifth pixel, based on at least one distance information between the second pixel and the first pixel and at least one distance information between the second pixel and the fifth pixel, when the luminance difference between the third pixel and the sixth pixel falls within the designated range.

4. The photographing apparatus of claim 1, wherein the generation of the color information corresponding to the second pixel comprises spreading color information from the first pixel to the second pixel, by using the color information of the first pixel.

5. The photographing apparatus of claim 2, wherein the generation of the color information corresponding to the second pixel comprises spreading color information from the fifth pixel to the second pixel, by using the color information of the fifth pixel.

6. A photographing apparatus comprising:
a first camera module configured to obtain a monochrome image having a first resolution, comprising an object;
a second camera module configured to obtain a color image having a second resolution lower than the first resolution, which comprises the object; and
a processor configured to:
obtain an upscaled color image by upscaling the second resolution of the color image to the first resolution, wherein the upscaled color image includes a plurality of first pixels of which color information are extracted from the color image of the second resolution and a plurality of second pixels generated by upscaling the second resolution of the color image, the plurality of second pixels being adjacent to the plurality of first pixels, respectively;
determine, based on a viewpoint disparity between the monochrome image and the upscaled color image, a plurality of third pixels in the monochrome image, a position of the third pixel corresponding to a position of the plurality of first pixels in the upscaled color image, and a plurality of fourth pixels in the monochrome image, the plurality of fourth pixels being adjacent to the plurality of third pixels, respectively, and a position of the plurality of fourth pixels corresponding to a position of the plurality of second pixels in the upscaled color image;
extract a contour of the object obtained from the monochrome image; and
determine color values of the plurality of second pixels by using the extracted contour and color values of the plurality of first pixels.

7. A method for controlling a photographing apparatus, the method comprising:
obtaining a first image having a first resolution;
obtaining a second image having a second resolution lower than the first resolution;
obtaining an upscaled second image by upscaling the second resolution of the second image to the first resolution, wherein the upscaled second image includes a first pixel of which color information is extracted from the second image of the second resolution and a second pixel generated by upscaling the second resolution of the second image, the second pixel being adjacent to the first pixel;
determining, based on a viewpoint disparity between the first image and the upscaled second image, a third pixel in the first image, a position of the third pixel corresponding to a position of the first pixel in the upscaled second image, and a fourth pixel in the first image, the fourth pixel being adjacent to the third pixel and a position of the fourth pixel corresponding to a position of the second pixel in the upscaled second image;
determining whether a luminance difference between the third pixel and the fourth pixel falls within a designated range; and
generating color information corresponding to the second pixel at least based on color information of the first pixel when the luminance difference between the third pixel and the forth pixel falls within the designated range.

8. The method of claim 7, wherein the upscaled second image further comprises a fifth pixel which is adjacent to the second pixel in an area other than an area where the second pixel is adjacent to the first pixel, a position of the fifth pixel corresponding to a position of a sixth pixel in the first image which is adjacent to the fourth pixel in an area other than an area where the fourth pixel is adjacent to the third pixel, color information corresponding to the fifth pixel being extracted from the second image of the second resolution,
and the method further comprises, when the luminance difference between the third pixel and the fourth pixel falls within the designated range, generating color information corresponding to the second pixel at least based on color information of the fourth pixel and color information of the sixth pixel.

9. The method of claim 7, wherein the upscaled second image further comprises a fifth pixel which is adjacent to the second pixel in an area other than an area where the second pixel is adjacent to the first pixel, a position of the fifth pixel corresponding to a position of a sixth pixel in the first image which is adjacent to the fourth pixel in an area other than an area where the fourth pixel is adjacent to the third pixel, color information corresponding to the fifth pixel being extracted from the second image of the second resolution,
and the method further comprises, when the luminance difference between the third pixel and the sixth pixel falls within the designated range, generating color information corresponding to the second pixel by using color information of the first pixel and color information of the fifth pixel, based on at least one distance information between the second pixel and the first pixel and at least one distance information between the sixth pixel and the fifth pixel.

10. The method of claim 7, wherein the generating of the color information corresponding to the second pixel comprises spreading color information from the first pixel to the second pixel by using the color information of the first pixel.

11. The method of claim 8, wherein the generating of the color information corresponding to the second pixel comprises spreading color information from the fifth pixel to the second pixel, by using the color information of the fifth pixel.

* * * * *